(12) United States Patent
Ahn et al.

(10) Patent No.: US 11,495,223 B2
(45) Date of Patent: Nov. 8, 2022

(54) ELECTRONIC DEVICE FOR EXECUTING APPLICATION BY USING PHONEME INFORMATION INCLUDED IN AUDIO DATA AND OPERATION METHOD THEREFOR

(71) Applicant: Samsung Electronics Co., Ltd., Suwon-si (KR)

(72) Inventors: Hyun Gi Ahn, Suwon-si (KR); Joo Yoo Kim, Suwon-si (KR); Ji Eun Kim, Suwon-si (KR); Dong Hyun Roh, Suwon-si (KR); Kyung Sub Min, Suwon-si (KR); Seung Eun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 16/770,322

(22) PCT Filed: Nov. 1, 2018

(86) PCT No.: PCT/KR2018/013162
§ 371 (c)(1),
(2) Date: Jun. 5, 2020

(87) PCT Pub. No.: WO2019/112181
PCT Pub. Date: Jun. 13, 2019

(65) Prior Publication Data
US 2020/0380978 A1    Dec. 3, 2020

(30) Foreign Application Priority Data
Dec. 8, 2017    (KR) .................. 10-2017-0168225

(51) Int. Cl.
*G10L 15/22*    (2006.01)
*G06F 3/16*    (2006.01)
(Continued)

(52) U.S. Cl.
CPC .............. *G10L 15/22* (2013.01); *G06F 3/167* (2013.01); *G10L 15/02* (2013.01);
(Continued)

(58) Field of Classification Search
None
See application file for complete search history.

(56) References Cited

U.S. PATENT DOCUMENTS

| 8,219,407 B1 | 7/2012 | Roy et al. |
| 8,798,995 B1 | 8/2014 | Edara |

(Continued)

FOREIGN PATENT DOCUMENTS

| JP | 2008-136646 A | 6/2008 |
| KR | 10-1295711 B1 | 8/2013 |

(Continued)

OTHER PUBLICATIONS

Korean Office Action dated Mar. 17, 2022, issued in Korean Application No. 10-2017-0168225.

*Primary Examiner* — Jonathan C Kim
(74) *Attorney, Agent, or Firm* — Jefferson IP Law, LLP

(57) ABSTRACT

An electronic device according to various embodiments may comprise a memory in which one or more applications are installed, a communication circuit, and a processor, wherein the processor is configured to acquire audio data during execution of a designated application among the one or more applications, wherein the acquiring of audio data comprises an operation of storing, in the memory, at least a portion including multiple pieces of phoneme information among the audio data, when a designated condition is satisfied, transmit the at least portion to an external electronic device so that the external electronic device generates designated information for execution of at least one application among the one or more applications by using at least a part of the (Continued)

multiple pieces of phoneme information stored before the designated condition is satisfied, and on the basis of the designated information, execute the at least one application in relation to the designated application.

13 Claims, 13 Drawing Sheets

(51) Int. Cl.
    *G10L 15/02*     (2006.01)
    *H04M 1/72466*     (2021.01)

(52) U.S. Cl.
    CPC ... *H04M 1/72466* (2021.01); *G10L 2015/025* (2013.01); *G10L 2015/223* (2013.01)

(56) References Cited

U.S. PATENT DOCUMENTS

| | | | |
|---|---|---|---|
| 10,068,572 B2* | 9/2018 | Choi | G10L 15/30 |
| 10,365,887 B1* | 7/2019 | Mulherkar | G06F 3/167 |
| 10,579,742 B1* | 3/2020 | Fernandez | G10L 15/16 |
| 10,854,192 B1* | 12/2020 | Maas | G10L 15/26 |
| 11,228,624 B1* | 1/2022 | Oueslati | H04L 65/1069 |
| 2008/0133233 A1 | 6/2008 | Tsubura | |
| 2008/0243548 A1* | 10/2008 | Cafer | G16H 40/67 |
| | | | 705/3 |
| 2009/0187407 A1* | 7/2009 | Soble | G10L 15/26 |
| | | | 704/E13.011 |
| 2010/0004023 A1* | 1/2010 | Jabri | A61B 5/7475 |
| | | | 455/556.1 |
| 2010/0009719 A1* | 1/2010 | Oh | H04N 7/141 |
| | | | 455/563 |
| 2010/0026817 A1* | 2/2010 | Ryan | H04N 7/147 |
| | | | 704/E11.001 |
| 2010/0104087 A1* | 4/2010 | Byrd | H04M 3/51 |
| | | | 379/265.09 |
| 2012/0209608 A1 | 8/2012 | Lee | |
| 2012/0253801 A1* | 10/2012 | Santos-Lang | G10L 15/22 |
| | | | 704/235 |
| 2013/0218582 A1* | 8/2013 | LaLonde | A61B 7/003 |
| | | | 600/324 |
| 2014/0058755 A1* | 2/2014 | Macoviak | G06Q 10/10 |
| | | | 705/2 |
| 2014/0074454 A1* | 3/2014 | Brown | G10L 15/08 |
| | | | 704/235 |
| 2014/0195255 A1* | 7/2014 | Ghosh | G16H 20/60 |
| | | | 705/2 |
| 2014/0244031 A1* | 8/2014 | Macoviak | G16H 40/67 |
| | | | 700/231 |
| 2015/0039317 A1 | 2/2015 | Klein et al. | |
| 2015/0046183 A1* | 2/2015 | Cireddu | G16H 10/60 |
| | | | 705/3 |
| 2016/0125883 A1* | 5/2016 | Koya | G10L 15/22 |
| | | | 704/232 |
| 2016/0140321 A1* | 5/2016 | Bowers | A61B 5/16 |
| | | | 704/271 |
| 2016/0180026 A1* | 6/2016 | Kim | G16H 10/60 |
| | | | 705/2 |
| 2016/0180743 A1* | 6/2016 | Ahmad | G16H 30/40 |
| | | | 434/262 |
| 2016/0302666 A1* | 10/2016 | Shaya | G16H 40/67 |
| 2017/0011200 A1* | 1/2017 | Arshad | G16H 30/20 |
| 2017/0032092 A1* | 2/2017 | Mink | G06Q 10/1095 |
| 2017/0293730 A1* | 10/2017 | Fish | A61B 5/0002 |
| 2017/0344713 A1* | 11/2017 | Riistama | G06F 16/24575 |
| 2018/0137250 A1* | 5/2018 | Ding | G16H 20/00 |
| 2018/0189452 A1* | 7/2018 | Serhani | G16H 40/67 |
| 2018/0197624 A1* | 7/2018 | Robaina | G16H 10/60 |
| 2018/0226158 A1* | 8/2018 | Fish | A61B 5/0022 |
| 2019/0043501 A1* | 2/2019 | Ramaci | G16H 40/20 |
| 2019/0108911 A1* | 4/2019 | Anumalasetty | G16H 15/00 |
| 2019/0122766 A1* | 4/2019 | Strader | G06F 16/3344 |
| 2019/0156818 A1* | 5/2019 | Piersol | G10L 17/22 |
| 2019/0214002 A1* | 7/2019 | Park | G10L 15/30 |
| 2020/0066414 A1* | 2/2020 | Neff | H04L 12/1818 |
| 2020/0135334 A1* | 4/2020 | Rajasekhar | G08B 25/016 |
| 2020/0168330 A1* | 5/2020 | Schulman | G16H 10/60 |
| 2020/0365256 A1* | 11/2020 | Hayashitani | G16H 40/20 |
| 2020/0380978 A1* | 12/2020 | Ahn | G10L 15/02 |
| 2022/0051810 A1* | 2/2022 | Kim | G16H 30/40 |

FOREIGN PATENT DOCUMENTS

| | | |
|---|---|---|
| KR | 10-1583984 B1 | 1/2016 |
| KR | 10-2016-0076264 A | 6/2016 |
| KR | 10-1643808 B1 | 7/2016 |
| KR | 10-1728941 B1 | 4/2017 |

* cited by examiner

ELECTRONIC DEVICE FOR EXECUTING APPLICATION BY USING PHONEME INFORMATION INCLUDED IN AUDIO DATA AND OPERATION METHOD THEREFOR

CROSS-REFERENCE TO RELATED APPLICATION(S)

This application is a U.S. National Stage application under 35 U.S.C. § 371 of an International application number PCT/KR2018/013162, filed on Nov. 1, 2018, which is based on and claimed priority of a Korean patent application number 10-2017-0168225, filed on Dec. 8, 2017, in the Korean Intellectual Property Office, the disclosure of which is incorporated by reference herein in its entirety

TECHNICAL FIELD

Various embodiments relate to a method and device for speech recognition of audio data while an audio-related application is executed.

BACKGROUND ART

With the development of digital technology, various electronic devices such as mobile communication terminals, personal digital assistants (PDAs), electronic notebooks, smart phones, tablet personal computers (PCs), or wearable devices have proliferated. As the various electronic devices have become widespread, intelligent applications or speech recognition applications executed through the various electronic devices are also being developed. For example, various electronic devices may activate a speech recognition application based on user input and may then receive a user's voice. The various electronic devices may perform an operation according to the recognized speech by transmitting audio data for the received voice to a server and receiving control information from the server.

DISCLOSURE OF INVENTION

Technical Problem

The electronic device may start a speech recognition service based on a wake-up method. For example, the electronic device may activate the speech recognition application when a call word (e.g., a voice call word), a touch, or a button for activating the speech recognition application is input, and may perform speech recognition only with respect to the voice received after the speech recognition application is activated. It may be difficult for such an electronic device to perform speech recognition on speech that is uttered while audio is being received through a call application or while audio is being played through a recording application.

According to various embodiments, by receiving a designated input while receiving audio data through an application related to audio, it is possible to provide an electronic device and method for performing speech recognition on the audio data received before receiving the designated input.

The technical problems to be achieved in this document are not limited to the technical problems mentioned above, and other technical problems not mentioned will be clearly understood by those skilled in the art from the following description.

Solution to Problem

An electronic device according to various embodiments may include: a memory in which one or more applications are installed; a communication circuit; and a processor, wherein the processor is configured to: acquire audio data while a designated application among the one or more applications is being executed, the acquiring including storing at least a partial section including a plurality of pieces of phoneme information among the audio data in the memory; when a designated condition is satisfied, transmit the at least the partial section to an external electronic device so that the external electronic device generates designated information for executing at least one application among the one or more applications by using at least a portion of the plurality of pieces of phoneme information stored before the designated condition is satisfied; and execute the at least one application in relation to the designated application based at least on the designated information.

A method of an electronic device according to various embodiments may include: acquiring audio data while a designated application among one or more applications stored in a memory of an electronic device is being executed, the acquiring including storing at least a partial section including a plurality of pieces of phoneme information among the audio data in the memory; when a designated condition is satisfied, transmitting the at least the partial section to an external electronic device so that the external electronic device generates designated information for executing at least one application among the one or more applications by using at least a portion of the plurality of pieces of phoneme information, stored before the designated condition is satisfied; and executing the at least one application in relation to the designated application based at least on the designated information.

A non-transitory computer-readable recording medium in which a program is recorded according to various embodiments, the program performing a method including: acquiring audio data while a designated application among one or more applications stored in a memory of an electronic device is being executed, the acquiring including storing at least a partial section including a plurality of pieces of phoneme information among the audio data in the memory; when a designated condition is satisfied, transmitting the at least the partial section to an external electronic device so that the external electronic device generates designated information for executing at least one application among the one or more applications using at least a portion of the plurality of pieces of phoneme information stored before the designated condition is satisfied; and executing the at least one application in relation to the designated application based at least on the designated information.

Advantageous Effects of Invention

An electronic device and method according to various embodiments may perform speech recognition on audio data obtained before receiving a designated input by receiving the designated input while acquiring the audio data through an application related to audio.

The effects obtainable in the disclosure are not limited to the above-mentioned effects, and other effects not mentioned may be clearly understood by those skilled in the art from the description below.

BEST MODE FOR CARRYING OUT THE INVENTION

Figure 1:
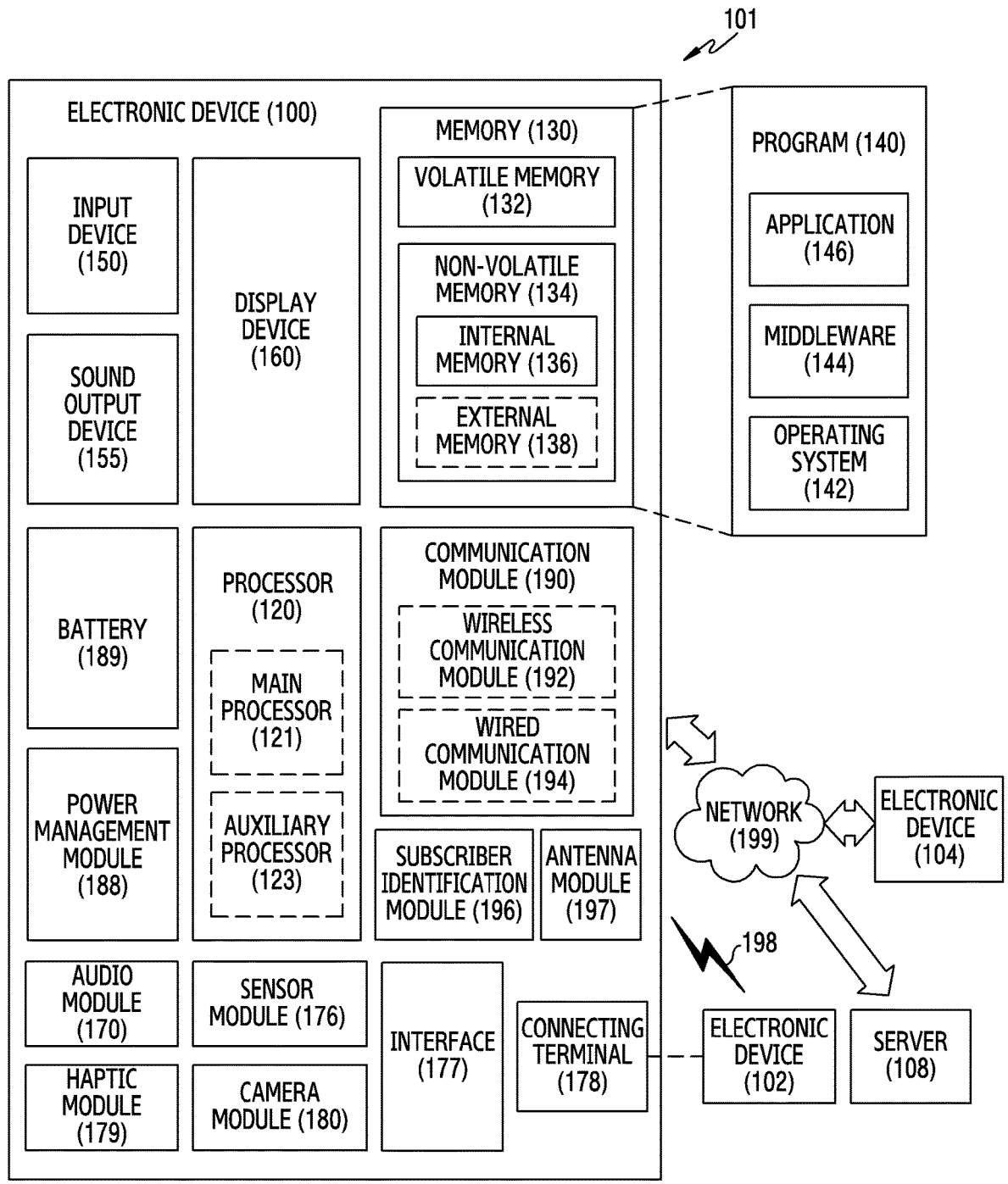
FIG. 1 is a block diagram illustrating an electronic device for executing an application using phoneme information included in audio data in a network environment according to various embodiments of the disclosure.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It is to be understood that a singular form corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PLAYSTORE), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a block diagram illustrating an electronic device 100 for executing an application using phoneme information included in audio data in a network environment 101 according to various embodiments of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or a pressure sensor (or a force sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, a barometer sensor, a magnetic sensor, an acceleration sensor, a grip sensor, a proximity sensor, a color sensor (e.g., RGB (red, green, blue) sensor), an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network using subscriber information stored in the subscriber identification module 196.

The antenna module 197 may include at least one antenna for transmitting or receiving a signal or power to or from the outside (e.g., the external electronic device). According to an embodiment, the communication module 190 (e.g., the wireless communication module 192) may transmit or receive the signal to or from the external electronic device through at least one antenna appropriate for a communication scheme used in the communication network.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102 or 104. For example, if the electronic device 101 should perform a function or a service automatically, or in response to a request from a user or another device, the electronic device 101, instead of, or in addition to, executing the function or the service, may request the one or more external electronic devices 102 or 104 to perform at least part of the function or the service. The one or more external electronic devices 102 or 104 receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
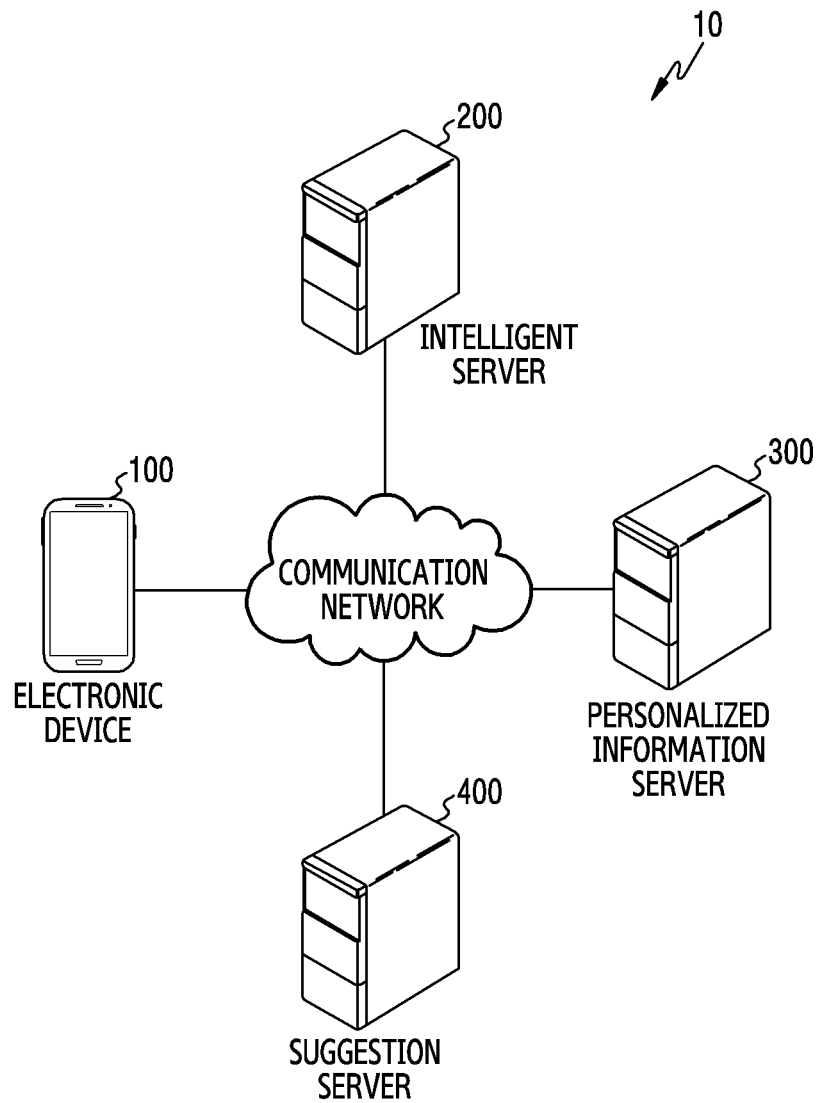
FIG. 2 is a diagram illustrating an integrated intelligent system according to various embodiments.

FIG. 2 is a diagram illustrating an integrated intelligent system according to various embodiments.

Referring to FIG. 2, an integrated intelligent system 10 may include an electronic device 100 (e.g., a user terminal), an intelligent server 200, a personalization information server 300, or a proposal server 400. For example, the server 108 of FIG. 1 may include an intelligent server 200, a personalization information server 300, or a suggestion server 400.

The electronic device 100 (e.g., a user terminal) may provide services necessary for a user through an app (or application) (e.g., an alarm app, a message app, a picture (gallery) app, or the like) stored in a memory. For example, the electronic device 100 may execute and operate another app through an intelligent app (or speech recognition app) stored in a memory 130. A user input for executing the other app may be received through the intelligent app of the electronic device 100. The user input may be received through, for example, a physical button, a touch pad, a voice input, a remote input, or the like. According to an embodiment, the electronic device 100 may include various terminal devices (or electronic devices) that can be connected to a communication network, such as a mobile phone, a smart phone, a personal digital assistant (PDA), or a notebook computer.

According to an embodiment, the electronic device 100 may receive a user's voice as user input. The electronic device 100 may receive the user's speech, and may generate a command to operate an app based on the user's speech. Accordingly, the electronic device 100 may operate the app using the command.

The intelligent server 200 may receive a user voice input from the electronic device 100 through a communication network and may convert the user voice input into text data. In another embodiment, the intelligent server 200 may generate (or select) a path rule based on the text data. The path rule may include information on an action (or operation) for performing the function of the app or information on parameters required to perform the action. Also, the path rule may include an order of execution of apps. The electronic device 100 may receive the path rule, select an app according to the path rule, and execute an operation included in the path rule in the selected app.

The term "path rule" in this document may generally refer to, but is not limited to, a sequence of states for an electronic device to perform a task requested by a user. In other words, the path rule may include information on the sequence of states. The task may be, for example, an arbitrary action that an intelligent app can provide. The task may include an operation of producing a schedule, sending a picture to a desired counterpart, or providing weather information. The electronic device 100 may perform the task by sequentially having at least one state (e.g., an operating state of the electronic device 100).

According to an embodiment, the path rule may be provided or generated by an artificial intelligence (AI) system. The AI system may be a rule-based system, a neural-network-based system (e.g., a feedforward neural network (FNN)), or a recurrent neural network (RNN). Alternatively, the AI system may be a combination of the above-described systems or another AI system. According to an embodiment, the path rule may be selected from a set of predefined path rules, or may be generated in real time in response to a user request. For example, the AI system may select at least one path rule among a plurality of predefined path rules, or may generate a path rule dynamically (or in real time). Also, the electronic device 100 may use a hybrid system to provide path rules.

According to an embodiment, the electronic device 100 may execute the above-described operation and may display a screen corresponding to the state of the electronic device 100 executing the operation on a display (e.g., the display device 160). In another example, the electronic device 100 may execute the operation and may not display the result obtained by performing the operation on the display (e.g., the display device 160). The electronic device 100 may execute, for example, a plurality of operations, and may display only some results among the plurality of operations on the display (e.g., the display device 160). The electronic device 100 may display, for example, only the result obtained by executing the last operation in the sequence on the display (e.g., the display device 160). In another example, the electronic device 100 may receive user input and may display a result obtained by executing the operation on the display (e.g., the display device 160).

The personalization information server 300 may include a database in which user information is stored. For example, the personalization information server 300 may receive user information (e.g., context information, app execution information, etc.) from the electronic device 100, and may store the received user information in the database. The intelligent server 200 may be used when receiving the user information from the personalization information server 300 through a communication network to generate a path rule for user input. According to an embodiment, the electronic device 100 may receive user information from the personalization information server 300 through the communication network and may use the received user information as information for managing the database.

The suggestion server 400 may include a database in which information on a function or an application to be introduced or information to be provided is stored in the terminal. For example, the electronic device 100 may receive information on the function to be provided from the suggestion server 400 through the communication network, and may provide the received information to the user.

However, the intelligent server 200, the personalization information server 300, and the suggestion server 400 are only examples of functional configurations of the integrated intelligent system 10, which is not limited thereto. For example, one or more of the functions of the intelligent server 200, the personalization information server 300, or the suggestion server 400 described above may be implemented or executed in a single server.

Figure 3:
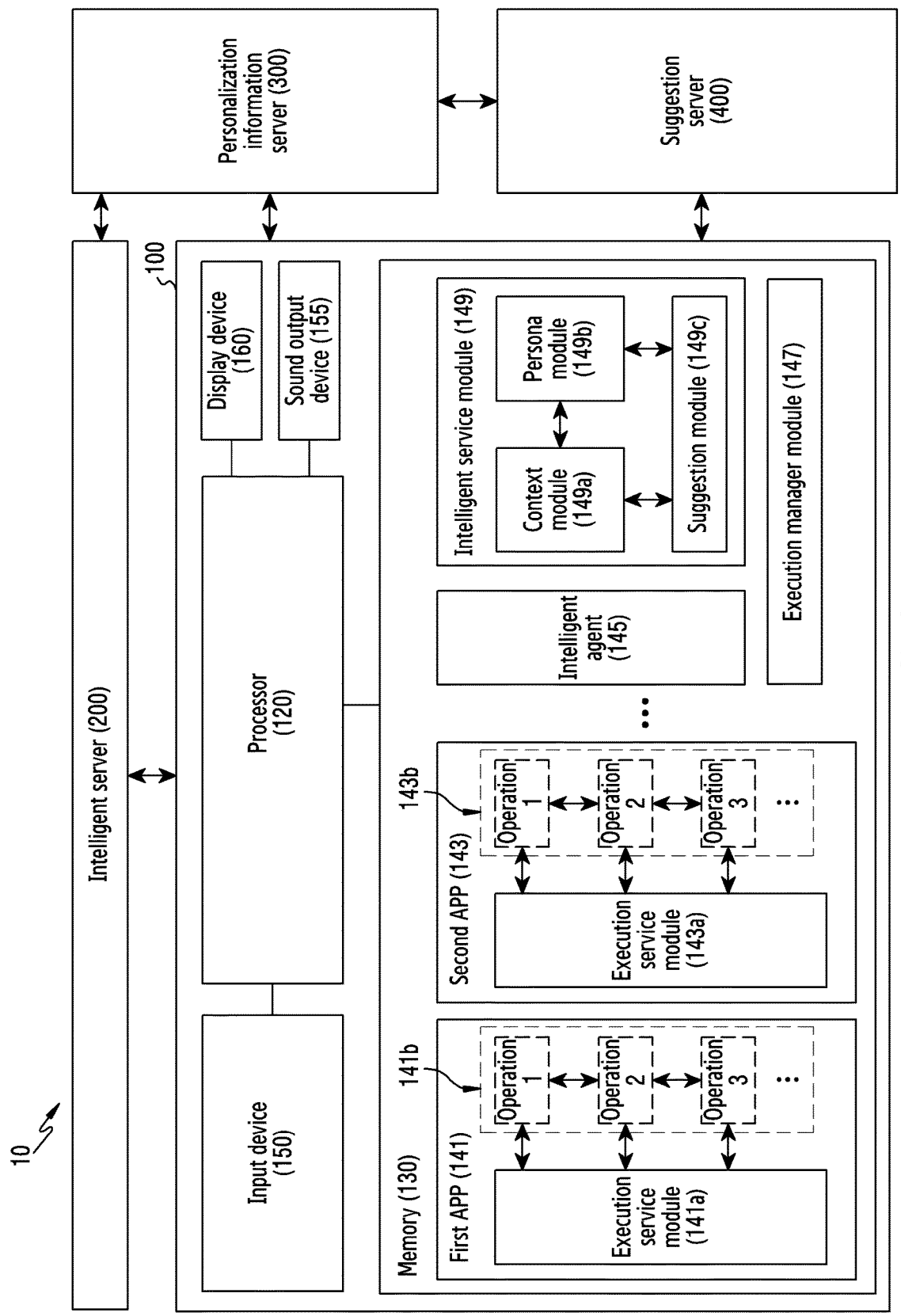
FIG. 3 is a block diagram illustrating an electronic device of an integrated intelligent system according to various embodiments of the disclosure.

FIG. 3 is a block diagram illustrating an electronic device of an integrated intelligent system according to various embodiments of the disclosure.

Referring to FIG. 3, the electronic device 100 may include an input device 150, a display device 160 (e.g., a display), a sound output device 155 (e.g., a speaker), a memory 130, or a processor 120. The electronic device 100 may further include a housing, and components of the electronic device 100 may be seated inside the housing or may be located on the housing. The electronic device 100 may further include a communication circuit located inside the housing. The electronic device 100 may transmit and receive data (or information) to and from an external server (e.g., the intelligent server 200) through the communication circuit.

According to an embodiment, the input device 150 may receive user input from a user. For example, the input device 150 may receive user input from a connected external device (e.g., a keyboard or a headset). In another example, the input device 150 may include a touch screen (e.g., a touch screen display) combined with the display device 160 (e.g., a display). In another example, the input device 150 may include a hardware key (or a physical key) positioned in the electronic device 100 (or the housing of the electronic device 100).

According to an embodiment, the input device 150 may include a microphone capable of receiving a user's speech as a voice signal. For example, the input device 150 may include a speech input system, and may receive a user's speech as a voice signal through the speech input system. The microphone may be exposed, for example, through a portion of the housing (e.g., a first portion).

According to an embodiment, the display device 160 (e.g., a display) may display an image, a video, and/or an execution screen of an application. For example, the display device 160 may display a graphic user interface (GUI) of an app. According to an embodiment, the display device 160 may be exposed through a portion of the housing (e.g., a second portion).

According to an embodiment, the sound output device 155 (e.g., a speaker) may output a voice signal. For example, the sound output device 155 may output a voice signal generated inside the electronic device 100 to the outside. According to an embodiment, the sound output device 155 may be exposed through a portion (e.g., a third portion) of the housing.

According to an embodiment, the memory 130 may store a plurality of apps (or applications) 141 and 143. The plurality of apps 141 and 143 may be, for example, programs for performing functions corresponding to user input. According to an embodiment, the memory 130 may store an intelligent agent 145, the execution manager module 147, or the intelligent service module 149. The intelligent agent 145, the execution manager module 147, and the intelligent service module 149 may constitute, for example, a framework (or application framework) for processing received user input (e.g., user speech).

According to an embodiment, the memory 130 may include a database capable of storing information necessary for recognizing user input. For example, the memory 130 may include a log database capable of storing log information. In another example, the memory 130 may include a persona database that can store user information.

According to an embodiment, the memory 130 may store a plurality of apps (e.g., the first app 141 and the second app 143), and the plurality of apps (e.g., the first app 141 and the second app 143) may be loaded and operated. For example, at least one of the plurality of apps (e.g., the first app 141 and the second app 143) stored in the memory 130 may be loaded and operated by the execution manager module 147. Each of the plurality of apps (e.g., the first app 141 and the second app 143) may include an execution service module (e.g., the execution service module 141*a* or the execution service module 143*a*) that performs a function. In one embodiment, each of the plurality of apps (e.g., the first app 141 and the second app 143) may execute one or more of a plurality of operations (e.g., sequence of states) (e.g., operations 141*b* or operations 143*b*) through the execution service module (e.g., the execution service module 141*a* or the execution service module 143*a*) in order to perform a function. In other words, the execution service module 141*a* may be activated by the execution manager module 147, and may execute one or more of operation 1, operation 2, and operation 3 included in the operations 141*b*. The execution service module 141*a* may be activated by the execution manager module 147, and may execute one or more of operation 1, operation 2, and operation 3 included in the operations 141*b*.

According to an embodiment, when at least one of the operations 141*b* of the first app 141 is executed, an execution status screen according to the execution may be displayed on the display device 160 (e.g., a display). The execution status screen may be, for example, a screen in which the operations 141*b* are completed. The execution status screen may be, for example, a screen in which at least one of the operations 141*b* is paused (partial landing) (e.g., when a parameter required for the operations 141*b* is not input). The second app 143 may be performed in the same manner as that in the first app 141.

According to an embodiment, the execution service module 141*a* may execute the at least one of the operations 141*b* according to the path rule. For example, the execution service module 141*a* may be activated by the execution manager module 147, may receive an execution request according to the path rule from the execution manager module 147, and may perform the at least one of the operations 141*b* according to the execution request, thereby executing the function of the app 141. When the execution of the operations 141*b* is completed, the execution service module 141*a* may transmit completion information to the execution manager module 147. The second app 143 may be performed in the same manner as the first app 141.

According to an embodiment, when the operations 141*b* are executed in the first app 141, the operations 141*b* may be executed sequentially. When the execution of one operation (e.g., operation 1 of the first app 141) is completed, the execution service module 141*a* may open the next operation (e.g., operation 2 of the first app 141) and may transmit completion information to the execution manager module 147. Here, opening an arbitrary operation may be understood as transitioning the arbitrary operation to an executable state or preparing for execution of the arbitrary operation. In other words, when the arbitrary operation is not opened, the corresponding operation cannot be executed. When the completion information is received, the execution manager module 147 may transmit an execution request for the next operation (e.g., operation 2 of the first app 141) to the execution service module. The second app 143 may be operated in the same manner as the first app 141.

According to an embodiment, when the plurality of apps (e.g., the first app 141 and the second app 143) is executed, the plurality of apps (e.g., the first app 141 and the second app 143) may be executed sequentially. For example, when execution of the last operation of the first app 141 (e.g., operation 3 of the first app 141) is completed and completion information is received, the execution manager module 147 may transmit the execution request of the first operation (e.g., operation 1 of the second app 143) of the second app 143 may be transmitted to the execution service 143*a*. According to another embodiment, the first app 141 and the second app 143 may be executed simultaneously in parallel.

According to an embodiment, when the operations 141*b* are executed in the first app 141, a result screen according to execution of each of the executed operations 141*b* may be displayed on the display device 160 (e.g., a display). According to an embodiment, only some of a plurality of result screens according to the execution of the executed operations 141*b* may be displayed on the display device 160. The second app 143 may be executed in the same manner as the first app 141. According to an embodiment, only some of the plurality of result screens according to the execution of the operations 141*b* of the first app 141 and the operations 143*b* of the second app 143 may be displayed on the display device 160.

According to an embodiment, the memory 130 may store an intelligent app (e.g., a speech recognition app) linked with the intelligent agent 145. The app linked with the intelligent agent 145 may receive and process the user's speech as a voice signal. According to an embodiment, the app linked with the intelligent agent 145 may be operated by specific input (e.g., input through a hardware key, input through a touch screen, or specific voice input) input through the input device 150.

According to an embodiment, the intelligent agent 145, the execution manager module 147, or the intelligent service module 149 stored in the memory 130 may be executed by the processor 120. The function of the intelligent agent 145, the execution manager module 147, or the intelligent service module 149 may be implemented by the processor 120. The functions of the intelligent agent 145, the execution manager module 147, and the intelligent service module 149 will be described as operations of the processor 120. According to an embodiment, the intelligent agent 145, the execution manager module 147, or the intelligent service module 149 stored in the memory 130 may be implemented in hardware as well as software.

According to an embodiment, the processor 120 may control the overall operations of the electronic device 100. For example, the processor 120 may control the input device 150 to receive user input. The processor 120 may control the display device 160 (e.g., a display) to display an image. The processor 120 may control the sound output device 155 (e.g., a speaker) to output a voice signal. The processor 120 may control the memory 130 to execute a program, and may load or store necessary information.

According to an embodiment, the processor 120 may execute the intelligent agent 145 stored in the memory 130, the execution manager module 147, or the intelligent service module 149. Accordingly, the processor 120 may implement the function of the intelligent agent 145, the execution manager module 147, or the intelligent service module 149.

According to an embodiment, the processor 120 may execute the intelligent agent 145 to generate a command to operate an app based on a voice signal received as user input. According to an embodiment, the processor 120 may execute the execution manager module 147 to execute the app (e.g., the first app 141 or the second app 143) stored in the memory 130 according to the generated command. According to an embodiment, the processor 120 may execute the intelligent service module 149 to manage user information, and may process user input using the user information.

According to an embodiment, the processor 120 may execute the intelligent agent 145 to transmit the user input, received through the input device 150, to the intelligent server 200, and may process the user input through the intelligent server 200.

According to an embodiment, the processor 120 may execute the intelligent agent 145 to pre-process the user input before transmitting the user input to the intelligent server 200. According to an embodiment, in order to pre-process the user input, the intelligent agent 145 may include an adaptive echo canceller (AEC) module, a noise suppression (NS) module, an end-point detection (EPD) module, or an automatic gain control (AGC) module. The AEC module may remove an echo included in the user input. The NS module may suppress background noise included in the user input. The EPD module may detect an end point of the user's voice included in the user input, and may use the detected end point to find a portion where the user's voice is present. The AGC module may recognize the user input and may adjust the volume of the user input to be suitable for processing the recognized user input. According to an embodiment, the processor 120 may execute all of the pre-processing components for the purpose of performance, but in another embodiment, the processor 120 may execute some of the pre-processing components to operate at low power.

According to an embodiment, the intelligent agent 145 may execute a wake-up recognition module stored in the memory 130 to recognize a user's call. Accordingly, the processor 120 may recognize a user's wake-up command through the wake-up recognition module, and may execute the intelligent agent 145 for receiving user input when the wake-up command is received. The wake-up recognition module may be implemented by a low-power processor (e.g., a processor included in an audio codec). According to an embodiment, the processor 120 may execute the intelligent agent 145 when user input is received through a hardware key. When the intelligent agent 145 is executed, an intelligent app (e.g., a speech recognition app) linked with the intelligent agent 145 may be executed.

According to an embodiment, the intelligent agent 145 may include a speech recognition module for executing user input. The processor 120 may recognize user input for executing an operation in an app through the speech recognition module. For example, the processor 120 may recognize limited user (voice) input (e.g., speech such as "click" for executing a shooting operation while a camera app is running) for executing an operation such as the above wake-up command in the app 141 or 143 through the speech recognition module. The processor 120 may assist the intelligent server 200 to recognize and quickly process a user command that can be processed through the speech recognition module in the electronic device 100. According to an embodiment, the speech recognition module of the intelligent agent 145 for executing user input may be implemented in an app processor.

According to an embodiment, the speech recognition module of the intelligent agent 145 (including the speech recognition module of the wake-up module) may recognize user input using an algorithm for recognizing voice. The algorithm used to recognize the voice may be, for example, at least one of a hidden Markov model (HMM) algorithm, an artificial neural network (ANN) algorithm, or a dynamic time-warping (DTW) algorithm.

According to an embodiment, the processor 120 may execute the intelligent agent 145 to convert a user's voice input into text data. For example, the processor 120 may transmit the user's voice to the intelligent server 200 through the intelligent agent 145, and may receive text data corresponding to the user's voice from the intelligent server 200. Accordingly, the processor 120 may display the converted text data on the display device 160.

According to an embodiment, the processor 120 may execute the intelligent agent 145 to receive a path rule from the intelligent server 200. According to an embodiment, the processor 120 may transmit the path rule to the execution manager module 147 through the intelligent agent 145.

According to an embodiment, the processor 120 may execute the intelligent agent 145 to transmit an execution result log according to the path rule received from the intelligent server 200 to the intelligent service module 149, and the transmitted execution result log may be accumulated and managed in preference information of a user of a persona module (persona manager) 149*b*.

According to an embodiment, the processor 120 may execute the execution manager module 147 to receive a path rule from the intelligent agent 145, to execute an app (e.g., at least one of the first app 141 or the second app 143) based on the path rule, and to allow the executed app to execute operations (e.g., at least one of the operations 141*b* or the operations 143*b*) included in the path rule. For example, the processor 120 may transmit command information (e.g., path rule information) for allowing the app (e.g., at least one of the first app 141 or the second app 143) to execute operations (e.g., at least one of the operations 141*b* or the operations 143*b*) based on the path rule through the execution manager module 147, and may receive information about completion of the operations from the app.

According to an embodiment, the processor 120 may execute the execution manager module 147 to transmit command information (e.g., path rule information) for executing the operations (e.g., one or more of the operations 141*b* or the operations 143*b*) of the app between the intelligent agent 145 and the app (e.g., one or more of the first app 141 or the second app 143). The processor 120 may bind the app (e.g., one or more of the first app 141 or the second app 143) to be executed according to the path rule through the execution manager module 147, and may transmit the command information (e.g., path rule information) of the operation (e.g., one or more of the operations 141*b* or the operations 143*b*) included in the path rule to the bound app. For example, the processor 120 may sequentially transmit the operation (e.g., one or more of the operations 141*b* or the operations(?) 143*b*) included in the path rule through the execution manager module 147 to the bound app, thereby sequentially executing the operation included in the path rule of the app according to the path rule.

According to an embodiment, the processor 120 may execute the execution manager module 147 to thereby manage the execution state of the operations 141*b* of the first app 141. For example, the processor 120 may receive information on the execution state of the operations 141*b* from the first app 141 through the execution manager module 147. When the execution state of the operations 141*b* is, for example, stopped (partial landing) (e.g., when a parameter required for the operations 141*b* is not input), the processor 120 may transmit information on the stopped state through the execution manager module 147 to the intelligent agent 145. The processor 120 may use the information received through the intelligent agent 145 to request input of information (e.g., parameter information) necessary for a user. When the execution state of the operations 141*b* is, for example, an operation state, the processor 120 may receive speech from the user through the intelligent agent 145. The processor 120 may transmit information on the first app 141 and information on the execution state of the first app 141 to the intelligent agent 145 through the execution manager module 147. The processor 120 may transmit the user speech to the intelligent server 200 through the intelligent agent 145. The processor 120 may receive parameter information of the user's speech from the intelligent server 200 through the intelligent agent 145. The processor 120 may transmit the received parameter information to the execution manager module 147 through the intelligent agent 145. The execution manager module 147 may change the parameter of the operations 141b to a new parameter using the received parameter information. The second app 143 may be executed in the same manner as the first app 141.

According to an embodiment, the processor 120 may execute the execution manager module 147 to transmit the parameter information included in the path rule to the app (e.g., the first app 141 and the second app 143). When a plurality of apps (e.g., the first app 141 and the second app 143) is sequentially executed according to the path rule, the execution manager module 147 may transmit the parameter information included in the path rule from one app (e.g., the first app 141) to another app (e.g., the second app 143).

According to an embodiment, the processor 120 may execute the execution manager module 147 to receive a plurality of path rules. The processor 120 may select a plurality of path rules based on the user's speech through the execution manager module 147. For example, when the user's speech has specified some first apps 141 to perform some operations 141b through the execution manager module 147 but does not specify other second apps 143 to execute the remaining operations 143b, the processor 120 may receive a plurality of path rules different from each other in which the same first app 141 (e.g., gallery app) to perform some operations 141b is executed and different second apps 143 (e.g., massage app or telegram app) to perform the remaining operations 143b are executed. The processor 120 may execute the same operation (e.g., the operations 141b and the operations 143b) (e.g., the same consecutive operations {e.g., the operations 141b and the operations 143b}) of the plurality of path rules through the execution manager module 147. When the same operation is executed, the processor 120 may display a state screen, on which different apps (e.g., the first app 141 or the second app 143), each included in the plurality of path rules, can be selected through the execution manager module 147, on the display 160 (e.g., the display).

According to an embodiment, the intelligent service module 149 may include a context module 149a, a persona module 149b, or a suggestion module 149c.

The processor 120 may execute the context module 149a to collect the current state of the app from the app (e.g., at least one of the first app 141 or the second app 143). For example, the processor 120 may execute the context module 149a to receive context information indicating the current state of the first app 141, and may collect the current state of the first app 141 through the received context information.

The processor 120 may execute the persona module 149b to manage the personal information of a user who uses the electronic device 100. For example, the processor 120 may execute the persona user module 149b to collect usage information and performance statistics of the electronic device 100, and may use the collected usage information and performance statistics of the electronic device 100 to manage the personal information of the user.

The processor 120 may execute the suggestion module 149c to predict a user's intent and may recommend a command to the user based on the user's intent. For example, the processor 120 may execute the suggestion module 149c to recommend a command to the user according to the user's current state (e.g., the time, place, situation, or app).

Figure 4:
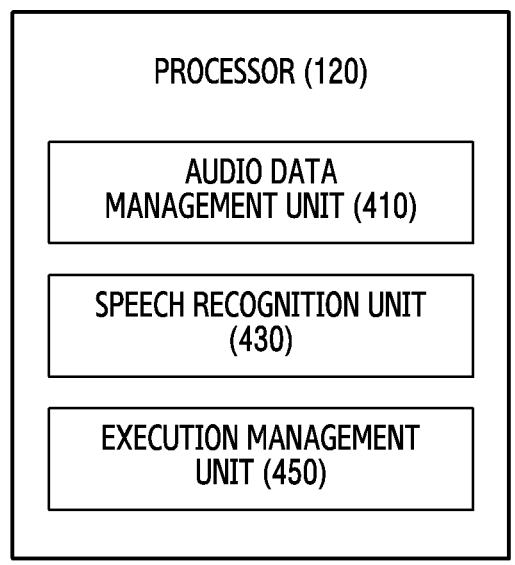
FIG. 4 illustrates an example of a functional configuration of a processor in an electronic device according to various embodiments.

FIG. 4 illustrates an example of the functional configuration of a processor in an electronic device according to various embodiments.

Referring to FIG. 4, the processor 120 may include an audio data management unit 410, a speech recognition unit 430, and an execution management unit 450. The audio data management unit 410, the speech recognition unit 430, and the execution management unit 450 may be included in the processor 120 including processing circuitry as a hardware module or a software module.

The audio data management unit 410 may identify (or confirm) that a first application related to audio is executed. The first application related to audio may be designated in advance. For example, the first application may include an application that can receive or output audio data such as a video call application, a voice call application, a telemedicine application, an audio output (or playback) application (e.g., a media player), a recording application, or an audio-related application. The first application may be an application that uses a buffer for storing (or temporarily storing) audio data related to the first application.

The audio data management unit 410 may store audio data received through the first application when it is identified that the first application related to audio is executed. The audio data received through the first application may include audio data related to the voice of a counterpart received through a network, audio data related to a user voice of the electronic device 100 received through a microphone, and audio data reproduced or recorded through a recording (or audio output) application. The audio data management unit 410 may store at least some sections including a plurality of pieces of phoneme information among the received audio data.

For example, the audio data management unit 410 may control a buffer (not shown) to temporarily store audio data received through the first application (not shown). When audio data having a predetermined size is stored in the buffer, the audio data management unit 410 may control the buffer to store newly received audio data while deleting the oldest audio data. In another example, the audio data management unit 410 may store, in the memory 130, the received audio data in a voice file recording format.

In some embodiments, when the first application is one of a video call application, a voice call application, and a telemedicine application, the audio data management unit 410 may store (or temporarily store) audio data related to the voice of the counterpart and/or audio data related to the voice of the user of the electronic device 100.

The audio data management unit 410 may store the audio data received through the communication module 190 (i.e., over a network) in the buffer or the memory 130 to store the audio data related to the voice of the counterpart. The audio data management unit 410 may store encoded audio data received through the communication module 190 as is without decoding the encoded audio data. Alternatively, the audio data management unit 410 may decode the encoded audio data received through the communication module 190 using a codec, and then may store a pulse code modulation (PCM) signal.

The audio data management unit 410 may store audio data received through a microphone in the buffer or the memory 130 to store the audio data related to the voice of the user of the electronic device 100. The audio data management unit 410 may encode the audio data received through a microphone using a codec and may store the encoded audio data in the buffer or the memory 130.

For example, the audio data management unit 410 may distinguish and store the voice of the counterpart from the voice of the user of the electronic device 100. The audio data management unit 410 may attach a different tag to each of audio data received through the communication module 190 and audio data received through the microphone, and may store them in one buffer. Alternatively, using two buffers, the audio data management unit 410 may store the audio data received through the communication module 190 in one buffer and may store the audio data received through the microphone in the other buffer. In another example, the audio data management unit 410 may store the voice of the counterpart and the voice of the user of the electronic device 100 in one buffer in the temporal order of reception thereof without distinguishing therebetween.

In some other embodiments, when the first application is a recording application, the audio data management unit 410 may control the buffer to temporarily store reproduced audio data. When audio data having a predetermined size is stored in the buffer, the audio data management unit 410 may control the buffer to store the reproduced audio data while audio data is deleted, starting from the oldest audio data. Alternatively, the audio data management unit 410 may store audio data recorded through a recording application in the memory 130.

The audio data management unit 410 may receive a request for audio data from the speech recognition unit 430. The audio data management unit 410 may extract audio data to be transmitted to the speech recognition unit 430 among the audio data stored in the buffer or the memory 130 in response to reception of the request for audio data from the speech recognition unit 430. For example, in response to reception of the request for audio data from the speech recognition unit 430, the audio data management unit 410 may extract audio data having a designated size that was stored most recently in the buffer. That is, the audio data management unit 410 may extract audio data from a time point at which the request for audio data is received until the start of a reference period (e.g., 10 seconds). The audio data management unit 410 may transmit the extracted audio data to the speech recognition unit 430. Alternatively, the audio data management unit 410 may transmit all of the audio data, having a predetermined size stored in the buffer, to the speech recognition unit 430 in response to receiving the request for audio data.

The speech recognition unit 430 (e.g., an intelligent client) may be linked with the intelligent agent 145 stored in the memory 130 to execute the intelligent agent 145. The speech recognition unit 430 may be linked with the intelligent agent 145 while the first application related to audio is being executed, and may execute a second application related to speech recognition (e.g., an intelligent app or a speech recognition app) in the background. The operations of the speech recognition unit 430 described below may be operations performed in conjunction with the second application (e.g., an intelligent app or a speech recognition app) executed in the background.

The speech recognition unit 430 may request audio data from the audio data management unit 410 in response to receiving a designated input while the first application related to audio is being executed. The designated input may be input for transmitting audio data to the server 108 (e.g., the intelligent server 200) in order to perform speech recognition related to the audio data stored in the buffer or the memory 130.

For example, the speech recognition unit 430 may drive the second application (e.g., an intelligent app or a speech recognition app) related to speech recognition in response to receiving designated input while the first application related to audio is being executed. The speech recognition unit 430 may request audio data from the audio data management unit 410 through the second application, substantially at the same time as the second application is driven. The designated input may be input from a user or input in the case in which a pre-stored condition is satisfied. Among the designated inputs, the input by the user may include input through a physical key, input to an object included in the user interface, input related to receiving a specific word (e.g., "Bixby") through a microphone, and the like. The case in which the pre-stored condition is satisfied among the designated inputs may include the case in which there is no speech for a designated time or longer, the case in which a specific word is included in the received audio data, or the case in which the intonation at the end of the speech changes, thereby indicating a question.

The speech recognition unit 430 may receive audio data from the audio data management unit 410. For example, from among the audio data stored in the buffer or the memory 130, the speech recognition unit 430 may receive (or obtain) audio data from the time point at which a designated input is received (that is, the time point at which audio data is requested) until the start of a reference period (e.g., 10 seconds). Alternatively, the speech recognition unit 430 may receive all the audio data stored in the buffer based on the time point at which the designated input is received.

In some embodiments, the speech recognition unit 430 may not only receive the audio data stored in the buffer when the designated input is received, but may also additionally acquire audio data through the microphone after the designated input is received.

The speech recognition unit 430 may control the communication module 190 to transmit the received audio data to the server 108 (e.g., the intelligent server 200). In some embodiments, the speech recognition unit 430 may not only transmit first audio data stored in the buffer to the server 108 when the designated input is received, but may also transmit second audio data, additionally obtained through the microphone after the designated input is received, to the server 108. For example, the first audio data may be audio data acquired before a designated input (e.g., Bixby call), and the second audio data may be audio data acquired after the designated input (e.g., Bixby call). For example, the first audio data may be used to identify a speaker's intent, and the second audio data may be used to analyze speech content based on the intent identified from the first audio data.

In addition, the speech recognition unit 430 may receive control information (e.g., the path rule) based on audio data from the server 108 through the communication module 190. The control information based on the audio data may include information on an action (or an operation) for performing the function of an app based on the intent of the audio data or information on a parameter necessary to perform the above action. Also, the control information may include the sequence of operation of the app. The speech recognition unit 430 may transmit the control information received from the server 108 to the execution management unit 450.

The execution management unit 450 may be linked with the execution manager module 147 stored in the memory 130 for execution of the execution manager module 147. The execution management unit 450 may act as an interface between the second application (e.g., an intelligent app and a speech recognition app) linked with the speech recognition unit 430 and a third application (e.g., the first app 141 or the second app 143) stored in the memory 130. The third application (e.g., the first app 141 and the second app 143) may include various applications such as a health care application, a calendar application, a gallery application, a search application, and the like.

The execution management unit 450 may receive control information based on audio data from the speech recognition unit 430. The execution management unit 450 may perform an operation included in the control information received from the speech recognition unit 430. For example, the execution manager 450 may load the third application (e.g., the first app 141 and the second app 143) corresponding to control information based on audio data. The execution management unit 450 may perform an operation included in the control information through the loaded third application. The execution manager 450 may control the execution service module (e.g., 141a or 143a) included in the third application to perform the operation included in the control information through the third application. For example, the execution management unit 450 may request execution of the operation from the execution service module of the third application in order to perform each operation included in the control information based on the audio data. Also, the execution management unit 450 may receive a result obtained by performing the operation from the execution service module of the third application. The execution management unit 450 or the execution service module (e.g., 141a or 143b) may display the result obtained by performing the operation included in the control information through the display device 160 (e.g., a display). The execution management unit 450 may transmit information obtained as the result obtained by performing the operation included in the control information to another electronic device (e.g., the counterpart of the call application or the telemedicine application among the first applications) through the communication module 190.

In some embodiments, the execution management unit 450 may perform a portion of the operation included in the control information, or may display a portion of the result obtained by performing the operation included in the control information. For example, the execution management unit 450 may display only a portion of the result obtained by performing the operation, based on at least one of the type of the first application, the type of the third application, or counterpart information. For example, the execution management unit 450 may determine a security level related to the level of information to be displayed as the result obtained by performing the operation, based on at least one of the type of the first application, the type of the third application, or the counterpart information.

In some embodiments, the execution management unit 450 may determine the information to be displayed as the result obtained by performing the operation, based on the counterpart information. The information displayed as the result obtained by performing the operation may be determined based on the information on the counterpart (e.g., a friend or a doctor). For example, in the case in which audio data related to sleep information is received from the counterpart, the amount of information (e.g., REM sleep data or data related to the four stages of sleep) displayed when the counterpart is a doctor may be larger than the amount of information (e.g., sleep time or the like) displayed when the counterpart is a friend.

In some other embodiments, the execution management unit 450 may determine information to be displayed as the result obtained by performing the operation based on the type of the first application. The information displayed as the result obtained by performing the operation may be determined based on the type of the first application (e.g., a call application or a telemedicine application). For example, in the case in which audio data regarding sleep information is received from the counterpart, the amount of information displayed when the first application is a telemedicine application (e.g., REM sleep data or data related to the four stages of sleep) may be larger than the amount of information displayed when the first application is a call application.

Examples of functional components according to various embodiments are not limited thereto. For example, the audio data management unit 410, the speech recognition unit 430, and the execution management unit 450 are only examples of functional components for explaining operations according to various embodiments, and the above-described operations may all be performed by the processor 120.

Although not shown, the server 108 (e.g., the intelligent server 200) may receive audio data from the electronic device 100, may determine (or generate) control information (or control information corresponding to audio data) based on the received audio data, and may transmit the determined (or generated) control information to the electronic device 100. For example, the server 108 may include an automatic speech recognition (ASR) module and a natural language understanding (NLU) module.

The ASR module may recognize the audio data received from the electronic device 100, and may convert the received audio data into text data. The algorithm used to recognize the audio data may be, for example, at least one of a hidden Markov model (HMM) algorithm, an artificial neural network (ANN) algorithm, or a dynamic time-warping (DTW) algorithm. The ASR module may transmit the converted text data to the NLU module.

The NLU module may understand the speaker's intent with respect to the input text data. Specifically, the NLU module may perform grammatical analysis on the input text data. The NLU module may divide the input text data into grammatical units (e.g., phrases, words, morphemes), may determine the grammatical meaning of each unit, and may match the text data included in each unit with the grammatical meaning. The NLU module may semantically analyze the input text data using the matching result. The semantic analysis may include semantic matching, rule matching, and formula processing.

The NLU module may acquire the domain and intent of the text data included in each unit or constituent elements (e.g., keyword {slot} or parameter), necessary for expressing intent, using the result of the semantic analysis. The NLU module may select the best intent from among a plurality of acquired intents through a disambiguation operation. The NLU module may determine the selected best intent as the speaker's intent. The NLU module may generate control information including the determined speaker's intent (or keyword {slot} or parameter). The NLU module may transmit the generated control information to the speech recognition unit 430 of the electronic device 100.

Figure 5:
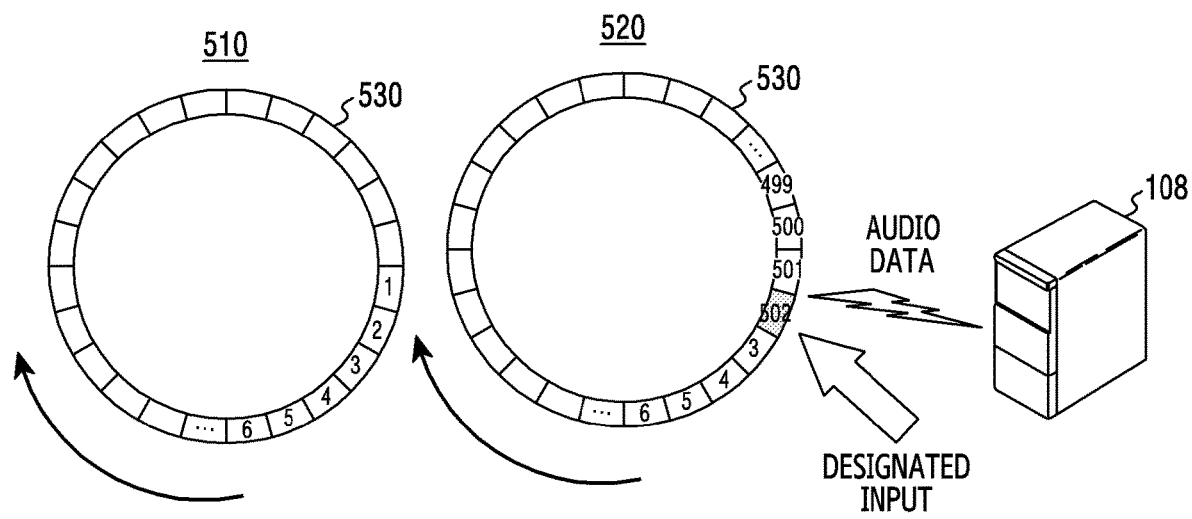
FIG. 5 illustrates an example of a buffer in an electronic device according to various embodiments.

FIG. 5 illustrates an example of a buffer in an electronic device according to various embodiments.

Referring to FIG. 5, a buffer for storing audio data received through a first application related to audio may be a ring buffer (or a circular buffer). However, the disclosure is not limited thereto, and the memory 130 storing (or temporarily storing) audio data according to various embodiments may include various types of buffers.

The first state 510 may be the state in which a buffer 530 stores audio data received through a first application while the first application related to audio is being executed. The first state 510 may be the state before the processor 120 receives designated input for performing speech recognition regarding the audio data stored in the buffer 530. The buffer 530 may store the audio data received through the first application in a frame unit having a designated size (e.g., 20 ms) in temporal order of reception. For example, in the buffer 530 of the first state 510, first audio data having a designated size (e.g., 20 ms) that is received first may be stored as a first frame, and second audio data having a designated size (e.g., 20 ms) that is received after the first audio data may be stored as a second frame.

The capacity of the buffer 530 may be fixed. That is, the maximum size of the audio data stored in the buffer 530 may be fixed to a predetermined size (e.g., 10 seconds). For example, when the maximum size of the audio data stored in the buffer 530 is 10 seconds and the size of one frame is 20 ms, the buffer 530 may store 500 frames. When the maximum capacity (e.g., 500 frames) of audio data is stored in the buffer 530, the buffer 530 may continue to store newly received audio data while audio data is deleted, starting from the oldest frame.

The second state 520 may be the state in which audio data having a size exceeding the size of the buffer 530 is received. The second state 520 may be the state following the first state 510. For example, the buffer 530 may have a size capable of storing 500 frames. In this case, when the buffer 530 stores the 500-th frame, the buffer 530 may be full. When receiving a 501-th frame after storing the 500-th frame, the buffer 530 may delete the first frame, which is the oldest frame, and may store the 501-th frame. In the same manner, when a 502-th frame is received after the 501-th frame, the buffer 530 may delete the second frame, which is the oldest stored frame, and may store the 502-th frame.

The processor 120 may receive designated input for performing speech recognition on the audio data stored in the buffer 530 at the time point at which the 502-th frame is stored in the buffer 530. For example, the audio data management unit 410 that controls the buffer 530 may receive a request for audio data from the speech recognition unit 430 driven by the designated input. The buffer 530 may extract audio data having a designated size, which is stored most recently in the buffer 530, from the time point at which the designated input is received.

In some embodiments, the buffer 530 may extract all of the audio data stored in the buffer 530 based on the time point at which the designated input is received. For example, when designated input is received in the second state 520, the buffer 530 may extract audio data from the third frame to the 502-th frame. When the size of one frame is 20 ms, the audio data corresponding to the extracted 500 frames may be the audio data received in the most recent 10 seconds.

In some other embodiments, the buffer 530 may extract audio data from the time point at which a designated input is received until the start of a reference period (e.g., 5 seconds). For example, when a designated input in the second state 520 is received, the buffer 530 may extract 250 frames from a 253-th frame to the 502-th frame. When the size of one frame is 20 ms, the audio data corresponding to the extracted 250 frames may be the audio data received in the most recent 5 seconds.

The audio data extracted from the buffer 530 may be transmitted to the server 108 (e.g., the intelligent server 200). For example, the processor 120 (or the audio data management unit 410) may transmit the audio data extracted from the buffer 530 to the speech recognition unit 430, and the speech recognition unit 430 may transmit the received audio data to the server 108 for the purpose of speech recognition.

An electronic device (e.g., the electronic device 100) according to various embodiments as described above may include: a memory (e.g., the memory 130) in which one or more applications (e.g., one or more applications including a first application, a second application, and a third application) are installed; a communication circuit (e.g., the communication module 190), and the processor (e.g., the processor 120), wherein the processor may be configured to: acquire audio data while a designated application (e.g., the first application) among the one or more applications is being executed, the acquiring including storing at least a partial section including a plurality of pieces of phoneme information from the audio data in the memory; transmit the at least the partial section to an external electronic device so that the external electronic device (e.g., the server 108) generates, when a designated condition is satisfied, designated information (e.g., control information) for executing at least one application (e.g., a third application) among the one or more applications using at least a portion of the plurality of pieces of phoneme information stored before the designated condition is satisfied; and execute the at least one application in relation to the designated application based at least on the designated information.

According to various embodiments, the processor may be configured to transmit information acquired based at least on the execution of the at least one application (e.g., the third application) to another external electronic device (e.g., an electronic device of a counterpart {e.g., a doctor or a friend}) using the communication circuit.

According to various embodiments, the processor may be configured to identify the plurality of pieces of phoneme information included in the audio data and to select the at least the partial section based at least on the identified result.

According to various embodiments, the processor may be configured to determine that the designated condition is satisfied when at least one of the case in which input through a physical key is received, the case in which input for an object included in a user interface of the designated application (e.g., the first application) is received, the case in which a designated word is received through a microphone (e.g., the input device 150) of the electronic device, the case in which a designated word is included in the acquired audio data, the case in which the audio data is not acquired for a designated time or longer, or the case in which intonation of the audio data is changed to a designated intonation is satisfied.

According to various embodiments, the processor may be configured to extract the at least the partial section to be transmitted to the external electronic device (e.g., the server 108) based on the time point at which the designated condition is satisfied.

According to various embodiments, when the designated condition is satisfied, the processor may be configured to transmit the at least the partial section having a designated size, which is stored last with respect to the time point at which the designated condition is satisfied, among the acquired audio data to the external electronic device (e.g., the server 108).

According to various embodiments, the designated application may be one of a call application or a telemedicine application, and the processor may be configured to distinguish and store the audio data acquired through the microphone of the electronic device and the audio data acquired through the communication circuit while the designated application is being executed.

According to various embodiments, the processor may be configured to: further acquire other audio data after the designated condition is satisfied; and further transmit at least a portion of the other audio data to the external electronic device so that the external electronic device generates the designated information by further using other phoneme information included in the other audio data.

According to various embodiments, the processor may be configured to display the acquired information through a display (e.g., the display device 160) of the electronic device according to a result obtained by executing the at least one application (e.g., a third application) based on the designated information (e.g., control information).

According to various embodiments, the processor may be configured to execute the at least one application (e.g., the third application) in the background while the designated application (e.g., the first application) is being executed.

A non-transitory computer-readable recording medium in which a program according to various embodiments as described above is stored may perform a method including: acquiring audio data while a designated application (e.g., a first application) among one or more applications (e.g., one or more applications including a first application, a second application, and a third application) stored in a memory (e.g., the memory 130) of an electronic device (e.g., the electronic device 100) is being executed, the acquiring including storing at least a partial section including a plurality of pieces of phoneme information among the audio data in the memory; when a designated condition is satisfied, transmitting the at least the partial section to an external electronic device so that the external electronic device (e.g., the server 108) generates designated information (e.g., control information) for executing at least one application (e.g., the third application) among the one or more applications using at least a portion of the plurality of pieces of phoneme information stored before the designated condition is satisfied; and executing the at least one application in relation to the designated application based at least on the designated information.

Figure 6A:
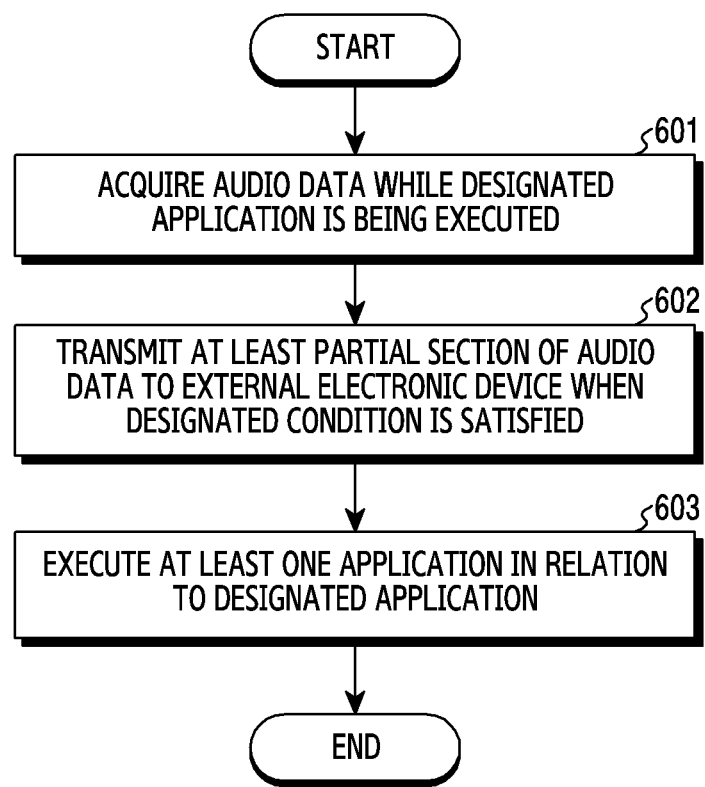
FIG. 6A illustrates an example of the operation of an electronic device according to various embodiments.

FIG. 6A illustrates an example of the operation of an electronic device according to various embodiments.

Referring to FIG. 6A, in operation 601, the processor 120 may acquire audio data while executing a designated application (e.g., a first application). The designated application may be a call application, a telemedicine application, a recording application, a voice file playback application, or a moving image (or video)-related application. The acquiring of the audio data may include storing at least a partial section, including a plurality of pieces of phoneme information among the audio data, in a memory.

According to various embodiments, the acquiring of the audio data may include acquiring video data including audio data. For example, the processor 120 may acquire video data including audio data while executing the video-related application. The processor 120 may store video data including the audio data in a video buffer (e.g., a ring buffer) corresponding to the buffer 530.

In operation 602, when a designated condition is satisfied, the processor 120 may transmit at least a partial section of the audio data to an external electronic device. For example, when the designated condition is satisfied, the processor 120 may transmit the at least the partial section to the external electronic device so that the external electronic device generates designated information (e.g., control information) for executing at least one application (e.g., a third application) using at least a portion of the plurality of pieces of phoneme information stored before the designated condition is satisfied.

According to various embodiments, the processor 120 may transmit at least a partial section of the video data stored in a video buffer to the external electronic device. For example, the processor 120 may extract the audio data from the at least the partial section of the video data stored in the video buffer, and may transmit only the extracted audio data to the external electronic device. In another example, the processor 120 may transmit the at least the partial section of the video data stored in the video buffer to the external electronic device, and the external electronic device may analyze the audio data included in the received video data.

In operation 603, the processor 120 may execute the at least one application (e.g., the third application) in relation to the designated application (e.g., the first application) based at least on the designated information (e.g., control information).

Figure 6B:
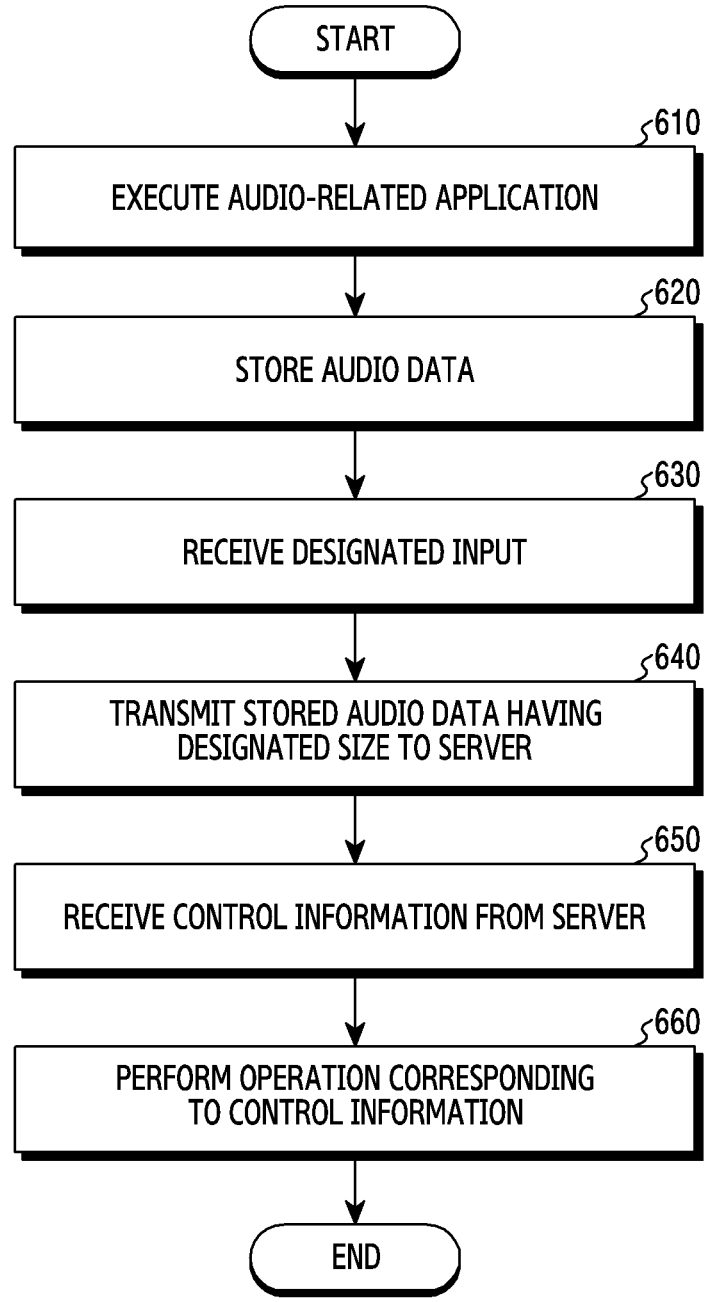
FIG. 6B illustrates another example of the operation of an electronic device according to various embodiments.

FIG. 6B illustrates another example of the operation of an electronic device according to various embodiments.

Referring to FIG. 6B, in operation 610, the processor 120 may execute an application related to audio. The processor 120 may identify that the application (hereinafter, referred to as a "first application") related to audio is executed. The first application may be designated in advance. For example, the first application may include an application that can receive or output audio data, such as a call application, a telemedicine application, or a recording (or audio output) application. The first application may include applications pertaining to a variety of forms of data, including audio data such as a moving image (or video)-related application or the like.

In operation 620, the processor 120 may store the audio data received through the first application. For example, when the designated first application is executed, the processor 120 may drive the audio data management unit 410 to store the audio data received through the first application. For example, the processor 120 may temporarily store the audio data received through the first application in the buffer 530, and may store the audio data in a memory-file recording format in the memory 130. In the case in which the audio data received through the first application is temporarily stored in the buffer 530, the processor 120 may store newly received audio data while deleting the oldest audio data when the buffer 530 is full.

When the first application is a telemedicine application or a call application, the audio data received through the first application may include audio data received through the communication module 190 (that is, via a network) and audio data received through a microphone. For example, the processor 120 may attach different tags to the audio data received through the communication module 190 and the audio data received through the microphone and store the same in one buffer 530. The processor 120 may store the audio data received through the communication module 190 in one buffer, and may store the audio data received through the microphone in another buffer. The processor 120 may store the audio data received through the communication module 190 in one buffer 530, and the audio data received through the microphone in temporal order of reception without distinguishing therebetween.

When the first application is a recording application (or voice file playback application), the audio data received through the first application may include audio data reproduced through the recording application (e.g., the voice file playback application). The audio data may be audio data stored in advance through the recording application. For example, the processor 120 may temporarily store audio data reproduced through the recording application in the buffer 530. The processor 120 may store the audio data in the memory 130 without separately storing the reproduced audio data in the buffer 530. Hereinafter, operations of the electronic device 100 will be described through an embodiment in which audio data is temporarily stored in the buffer 530. However, the disclosure is not limited thereto, and even when the audio data is stored in the memory 130 in a voice file recording format, the electronic device 100 may perform the same operations.

The processor 120 may store at least a partial section including a plurality of pieces of phoneme information, among the received audio data. For example, the processor 120 may drive a second application related to speech recognition in the background while the first application is being executed, and may identify the plurality of pieces of phoneme information among the received audio data through the second application. The processor 120 may store the at least the partial section including the plurality of pieces of phoneme information among the received audio data based on a result obtained by identifying the plurality of pieces of phoneme information.

In operation 630, the processor 120 may receive a designated input. The processor 120 may receive the designated input while the first application is being executed (that is, while the audio data received through the first application is being executed). The designated input may be input for transmitting the most recently stored audio data to the server 108 (e.g., the intelligent server 200) to perform speech recognition. The designated input may be input from a user (e.g., input through a physical key, input to an object included in a user interface, or input related to the reception of a specific word through a microphone), or may be input when a pre-stored condition is satisfied (e.g., when there is no speech for a designated time, when a specific word is included in the audio data received through the network, or when the intonation at the end of the speech changes to that of a question).

In operation 640, the processor 120 may transmit audio data having a designated size stored in the buffer 530 to the server 108 (e.g., the intelligent server 200) in response to reception of the designated input.

In some embodiments, the processor 120 may drive a second application related to speech recognition (e.g., an intelligent app or a speech recognition app) in the background in response to reception of the designated input while the first application is being executed. The processor 120 may transmit at least a portion of the audio data temporarily stored in the buffer 530 to the server 108 through the driven second application.

In some other embodiments, the processor 120 may drive the second application related to speech recognition in the background while the first application is being executed. The processor 120 may transmit, to the server 108, the at least a portion of the audio data temporarily stored in the buffer 530 through the second application in response to reception of the designated input. For example, the processor 120 may identify, as the designated input, the case in which a specific word is received through a microphone, the case in which there is no speech for a designated time or longer, the case in which a specific word is included in the audio data received through the network, or the case in which the intonation at the end of the speech changes to that of a question, using the second application driven in the background. The processor 120 may transmit at least a portion of the audio data temporarily stored in the buffer 530 to the server 108 when the designated input is identified.

When the designated input is received, the processor 120 may transmit audio data having a designated size that has been most recently stored in the buffer 530 to the server. For example, the processor 120 may transmit audio data from the time point at which the designated input is received among the audio data stored in the buffer 530 until the start of a reference period (e.g., 5 seconds) to the server 108. When receiving the designated input, the processor 120 may transmit the entire audio data having a designated size (e.g., 10 seconds) stored in the buffer 530 to the server 108.

The server 108 may perform speech recognition and natural language understanding on the received audio data, and may generate control information regarding a speaker's intent included in the audio data.

In operation 650, the processor 120 may receive control information on audio data from the server 108. The control information based on the audio data may include information on an action (or operation) for performing a function of an app or information on a parameter required to perform the operation. In addition, the control information may include the sequence of operation of the app.

In operation 660, the processor 120 may perform an operation corresponding to the received control information. For example, the processor 120 may load a third application (e.g., the first app 141 and the second app 143) stored in the memory 130 to perform the operation corresponding to the control information. For example, the third application may include various applications, such as a health care application, a calendar application, a gallery application, and a search application. The processor 120 may perform the operation corresponding to the control information through the loaded third application, and may display information obtained as a result of the execution through the display device 160 (e.g., a display). The processor 120 may transmit the information obtained as the result of the execution to another electronic device (e.g., the counterpart of a call application or a telemedicine application from the first application) through the communication module 190.

Figure 7:
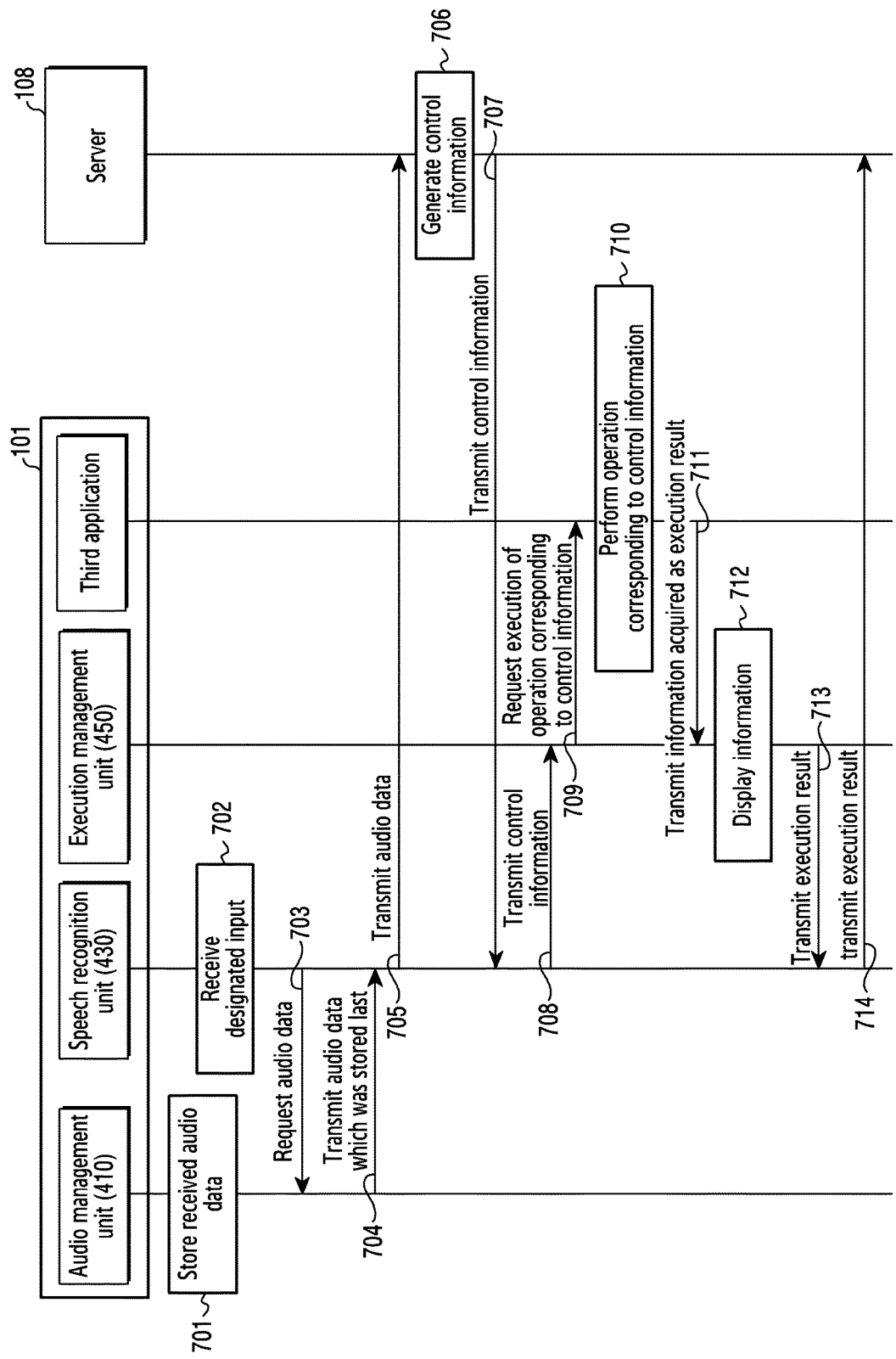
FIG. 7 illustrates an example of signal flow between an electronic device and a server according to various embodiments.

FIG. 7 illustrates an example of signal flow between an electronic device and a server according to various embodiments.

Referring to FIG. 7, in operation 701, the audio data management unit 410 may store audio data received through the first application in the buffer 530 or the memory 130. For example, when the first application is a telemedicine application or a call application, the audio data received through the first application may include audio data received through the communication module 190 and audio data received through the microphone. When the first application is a recording application, the audio data received through the first application may include audio data reproduced or recorded through a recording application.

In operation 702, the speech recognition unit 430 may receive a designated input. For example, the designated input may include input from a user or input when a pre-stored condition is satisfied.

In operation 703, the speech recognition unit 430 may request the stored audio data from the audio data management unit 410 in response to the reception of the designated input. For example, the speech recognition unit 430 may request audio data having a designated size that was most recently stored in the buffer 530 or the memory 130.

In operation 704, the audio data management unit 410 may transmit, to the speech recognition unit 430, the audio data having the designated size that was stored last (i.e., stored most recently) in the buffer 530 or the memory 130, in response to the request of the voice recognition unit 430. For example, the audio data management unit 410 may extract audio data from the time point at which the designated input is received until a reference section (e.g., 5 seconds) and may transmit the extracted audio data to the speech recognition unit 430.

In operation 705, the speech recognition unit 430 may transmit the audio data received from the audio data management unit 410 to the server 108 (e.g., the intelligent server 200) through the communication module 190.

In operation 706, the server 108 may perform speech recognition and natural language understanding on the received audio data to generate control information (e.g., path rules) related to the speaker's intent included in the audio data.

In operation 707, the server 108 may transmit the generated control information to the speech recognition unit 430.

In operation 708, the speech recognition unit 430 may transmit the control information received from the server 108 to the execution management unit 450. The execution management unit 450 may act as an interface between the second application (e.g., an intelligent app and a speech recognition app) linked with the speech recognition unit 430 and a third application (e.g., a health care application, a calendar application, a schedule application, a gallery application, or a search application) stored in the memory 130.

In operation 709, the execution manager 450 may request the third application (e.g., the health care application), indicated in the control information, to perform an operation corresponding to the control information. In some embodiments, the range of the third application may be determined based on the type of the first application. That is, the third application, which performs an operation or requests information according to the control information, may be limited according to the first application currently being executed. For example, when the first application is a telemedicine application, the third application may be limited to a health care application. In another example, when the first application is a call application or a recording application, the third application may be limited to a calendar application, a schedule application, a gallery application, or a search application. When the first application is a call application or a recording application, for security purposes, loading of the health care application as the third application may be blocked or restricted.

In operation 710, the third application, having received the request from the execution manager 450, may perform the operation corresponding to the control information. For example, the execution service module (e.g., 141a or 143a) of the third application may access various services (e.g., step counting, sleep tracking, weight management, or running) included in the third application (e.g., the health care application) according to the received request to perform an operation included in the control information.

In operation 711, the third application may transmit a result obtained by performing the operation included in the control information to the execution management unit 450. For example, the execution service module (e.g., 141a or 143a) of the third application (e.g., the health care application) may perform the operation included in the control information, thereby transmitting the obtained information (e.g., blood pressure information) to the execution management unit 450.

In operation 712, the execution management unit 450 may display information received from the third application (e.g., the health care application) (e.g., blood pressure information or the sleep time for the last 3 days) through the display device 160 (e.g., a display).

In operation 713, the execution management unit 450 may transmit a result of execution according to the control information to the speech recognition unit 430. For example, the execution manager 450 may transmit a response (e.g., ACK) indicating that the operation corresponding to the control information has been executed normally to the speech recognition unit 430.

In operation 714, the speech recognition unit 430 may transmit the result of execution according to the control information to the server 108. For example, the speech recognition unit 430 may transmit a response (e.g., ACK) indicating that the operation corresponding to the control information has been executed normally, to the server 108. When the server 108 receives the response, the speech recognition operation for the corresponding audio data may be terminated.

Meanwhile, in operation 701, receiving the audio data through the first application (e.g., the telemedicine application) and temporarily storing the received audio data in the buffer may be continuously performed over the entire algorithm (operations 701 to 714). While the first application (e.g., the telemedicine application) is being executed, the second application (e.g., the speech recognition application) linked with the speech recognition unit 430 and the third application (e.g., the health care application) associated with the speech recognition result may be executed in the background.

For example, based on the reception of the designated input while the first application (e.g., the telemedicine application) is executed, the speech recognition unit 430 (or a command or program linked with the speech recognition unit 430) may be driven in the background in order to transmit the audio data to the server 108.

In addition, while the first application is being executed, at least one third application (e.g., the health care application) may be executed in the background, based on a speech recognition result for the audio data received through the first application. According to some embodiments, the processor 120 may execute a plurality of third applications based on the first application. For example, based on the fact that the first application is a telemedicine application, the processor 120 may execute the health care application and the calendar application in the background as the third application. By executing the plurality of third applications based on the first application, in operation 711, information that is more suitable for the speaker's intent (e.g., a doctor or a patient) may be extracted.

Figure 8:
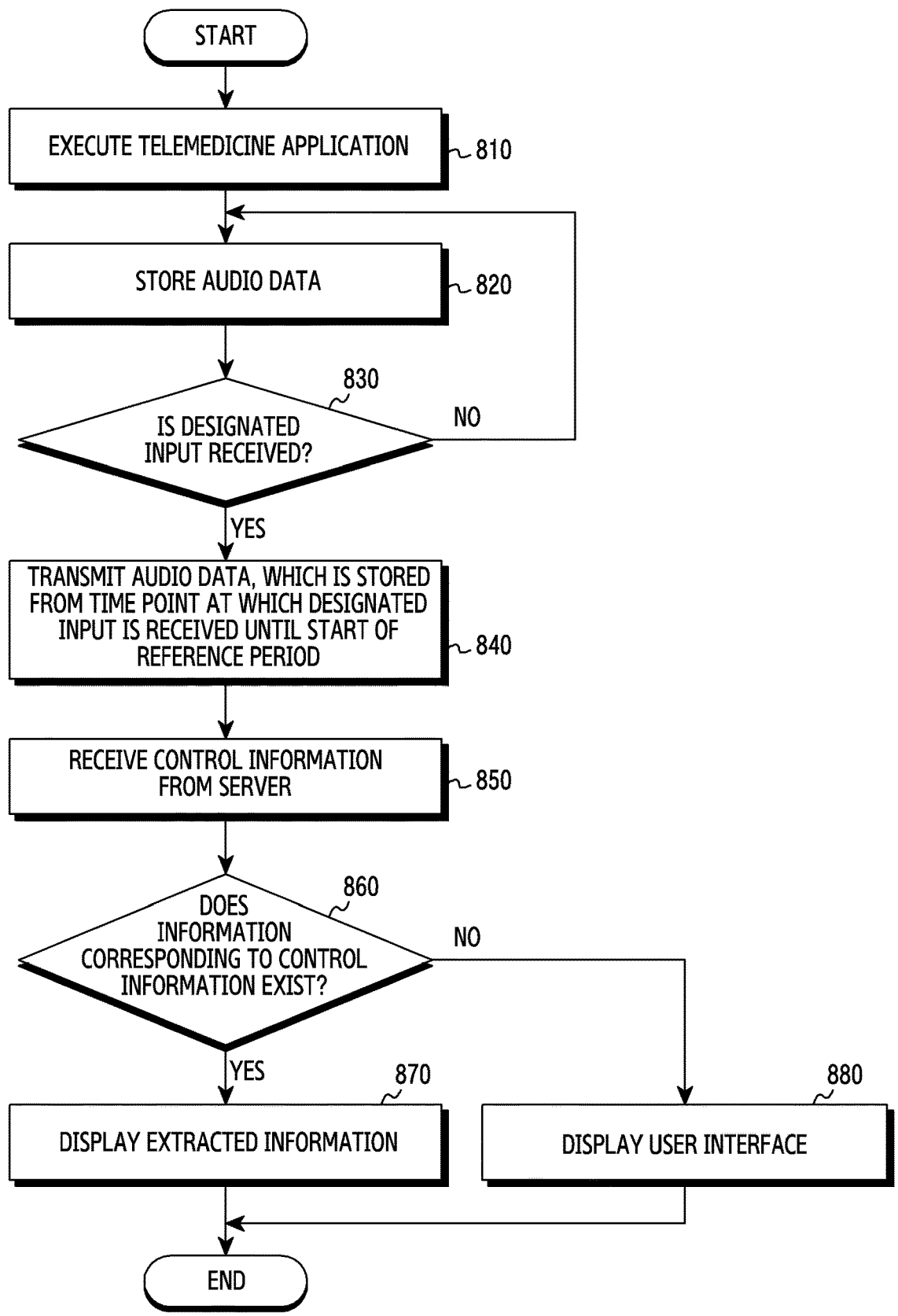
FIG. 8 illustrates an example of an operation of executing a telemedicine application in an electronic device according to various embodiments.

FIG. 8 illustrates an example of an operation of executing a telemedicine application in the electronic device 100 according to various embodiments. The operations of FIG. 8 may be performed by a patient's terminal.

Referring to FIG. 8, in operation 810, the processor 120 may execute a telemedicine application.

In operation 820, the processor 120 may store audio data received through the telemedicine application. The processor 120 may store the audio data received through the communication module 190 in order to store audio data of a counterpart doctor. The processor 120 may store audio data received through a microphone in order to store audio data of a patient who is a user of the electronic device 100. For example, the processor 120 may temporarily store the audio data received through the telemedicine application in the buffer 530. When the capacity of the buffer 530 is full, the processor 120 may continue to store newly received audio data while deleting the oldest audio data.

In operation 830, the processor 120 may determine whether a designated input is received. The designated input may include input from a user or the case where a pre-stored condition is satisfied. When the designated input is not detected, the processor 120 may continuously store the audio data received through the telemedicine application while the telemedicine application is being executed.

In operation 840, when the designated input is received, the processor 120 may extract audio data from the time point at which the designated input is received until the start of a reference period (e.g., 10 seconds or 5 seconds), and may transmit the extracted audio data to the server 108. The extracted audio data may be the entire audio data stored in the buffer 530 at the time point at which the designated input is received, or may be a portion of the audio data stored in the buffer 530. For example, the extracted audio data may be a doctor's speech such as "How is your blood pressure?".

According to some embodiments, the processor 120 may transmit, to the server 108, the audio data stored before the time point at which the designated input is received and the audio data received after the time point at which the designated input is received. For example, the processor 120 may receive the designated input from a user based on storing the doctor's speech "How is your blood pressure?" in the buffer 530 while the telemedicine application is being executed, and may receive speech of "Please tell me the most recent blood pressure value" after the designated input is received. The processor 120 may transmit, to the server 108, the audio data corresponding to "How is your blood pressure?" stored before the designated input is received and the audio data corresponding to "Please tell me the most recent blood pressure value" received after the designated input is received. By using both the audio data stored before the designated input is received and the audio data received after the designated input is received, the processor 120 may receive control information that is much more suitable for the speaker's speech.

Meanwhile, even when the processor 120 proceeds to operation 840 in the case in which the designated input is received, even if the operation proceeds to operation 840, the processor 120 may continue to store the audio data received while executing the telemedicine application in the buffer 530.

In operation 850, the processor 120 may receive control information (e.g., a path rule) corresponding to audio data from the server 108. Receiving the control information may include accessing a health care application, accessing a blood pressure service from the health care application, and retrieving and extracting a recent blood pressure record.

In operation 860, the processor 120 may determine whether information corresponding to an intent included in the control information exists. For example, the processor 120 may search for the presence or absence of a blood pressure measurement taken within a designated period (e.g., 3 days) in the blood pressure service included in the health care application.

In operation 870, when the information corresponding to the intent included in the control information exists in the memory 130, the processor 120 may extract and display the information. For example, when a blood pressure taken 10 hours ago is extracted from the blood pressure service included in the health care application, the processor 120 may display information on the blood pressure through the display device 160 (e.g., a display).

The processor 120 may transmit information, obtained as the result of performing an operation included in the control information, to another electronic device. For example, the processor 120 may transmit information regarding the blood pressure of a patient to an electronic device of a doctor through the communication module 190. The processor 120 may generate new image data and transmit the generated image data to the doctor's electronic device by combining the information on the patient's blood pressure with image data of the patient obtained through a camera. The processor 120 may transmit the information on the patient's blood pressure to the doctor's electronic device as data separate from the patient's image data obtained through the camera.

In operation 880, when no information corresponding to the intent included in the control information exists in the memory 130, the processor 120 may display an appropriate user interface (UI). For example, the processor 120 may display a UI indicating that there is no blood pressure information or a UI that prompts for the blood pressure to be measured again.

The processor 120 may transmit information obtained as the execution result to another electronic device (e.g., a counterpart of a call application or a telemedicine application from the first application).

Figure 9:
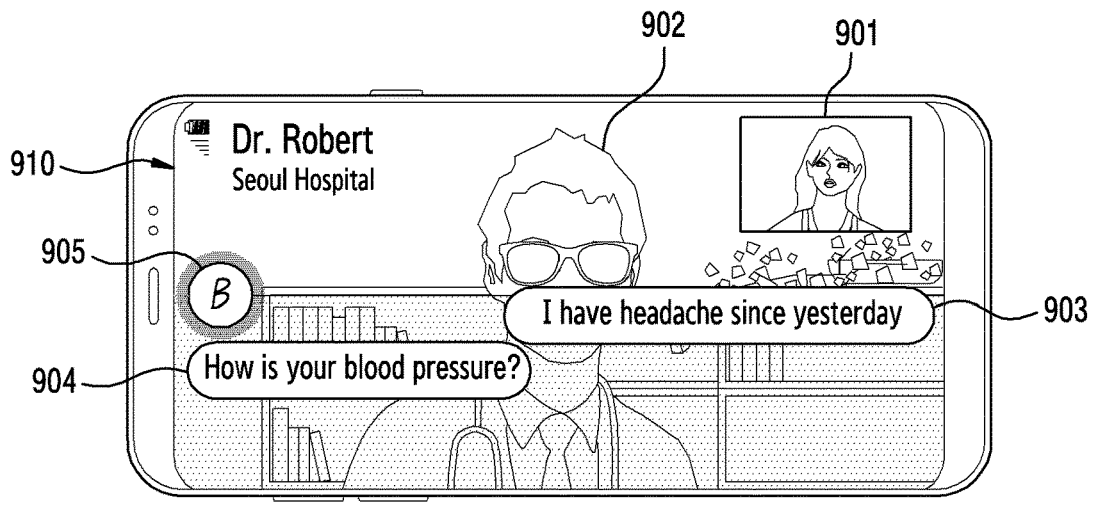
FIG. 9 illustrates an example of a user interface (UI) of an electronic device that executes a telemedicine application according to various embodiments.
Figure 9:
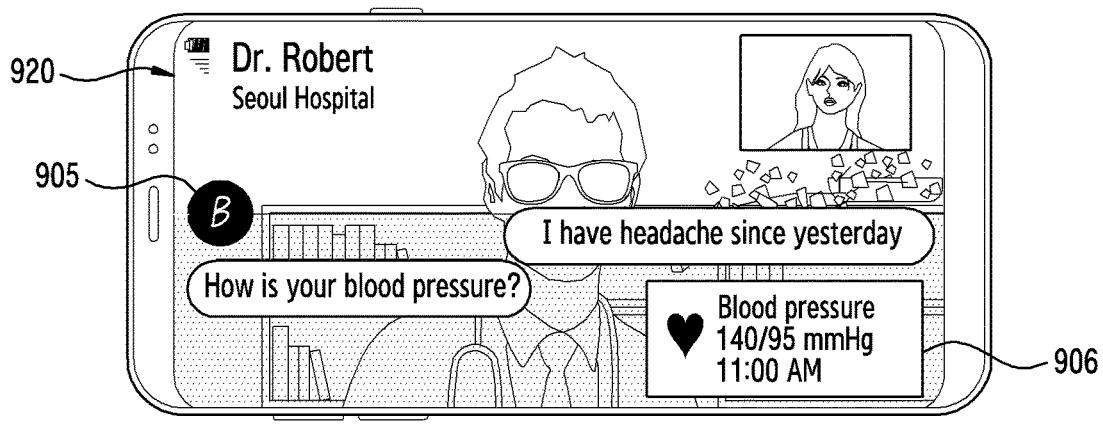
Figure 9:
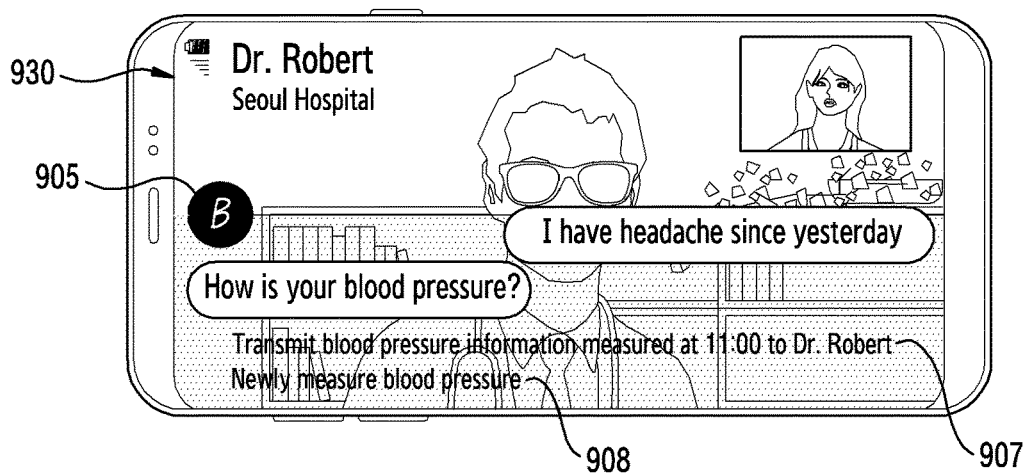

FIG. 9 illustrates an example of a UI of an electronic device that executes a telemedicine application according to various embodiments. The UIs of FIG. 9 can be displayed by a patient's terminal.

Referring to FIG. 9, the electronic device 100 of a patient executing a telemedicine application may display a first UI 910, a second UI 920, or a third UI 930.

The first UI 910 of the electronic device 100 executing the telemedicine application may include an image 901 of a user (e.g., a patient) of the electronic device 100 obtained through the camera of the electronic device 100. The first UI 910 may include an image 902 of the counterpart (e.g., a doctor) received through the communication module 190. The first UI 910 may display a first text 903 indicating the speech of a user (e.g., a patient) of the electronic device 100. The first UI 910 may display a second text 904 indicating the speech of the counterpart (e.g., a doctor). The first text 903 and the second text 904 may be converted from the received voice data to text data and may be displayed. The first text 903 and the second text 904 may be omitted.

When audio data of "How is your blood pressure?" is received from the doctor over a network, the user of the electronic device 100 may perform a designated input to automatically perform speech recognition on the audio data of "How is your blood pressure?". For example, the user may touch an object 905 included in the first UI 910. When the user touches the object 905, the electronic device 100 may transmit, to the server 108, audio data having a designated size (e.g., 10 seconds) stored most recently at the time point at which the touch is input. The electronic device 100 may receive control information (e.g., a path rule) on "How is your blood pressure?" from the server 108. The execution management unit 450 of the electronic device 100 may access the health care application included in the control information to perform an operation corresponding to the control information. The execution management unit 450 of the electronic device 100 may access the blood pressure service of the health care application included in the control information, and may retrieve information on whether a blood pressure measurement was taken within a designated period (e.g., three days).

When a blood pressure measurement was taken within the designated period (e.g., three days), the electronic device 100 may display the second UI 920 including blood pressure information 906. The electronic device 100 may display the second UI 920 in which the automatically extracted blood pressure information 906 is superimposed on the first UI 910.

The electronic device 100 may display the third UI 930 as a result of receiving the control information. The third UI 930 may include a guide 907 for transmitting the extracted blood pressure information to the doctor. The third UI 930 may include a guide 908 for newly measuring the blood pressure. For example, the electronic device 100 may identify the performance of the electronic device 100 or the performance of a device connected to the electronic device 100, and may display the guide 908 for newly measuring the blood pressure when a blood pressure measurement module exists.

Figure 10:
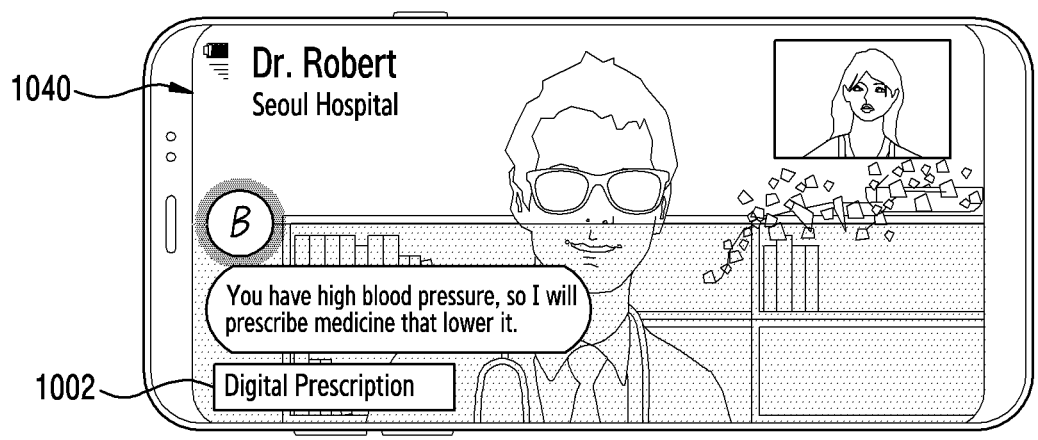
FIG. 10 illustrates another example of a UI of an electronic device that executes a telemedicine application according to various embodiments.
Figure 10:
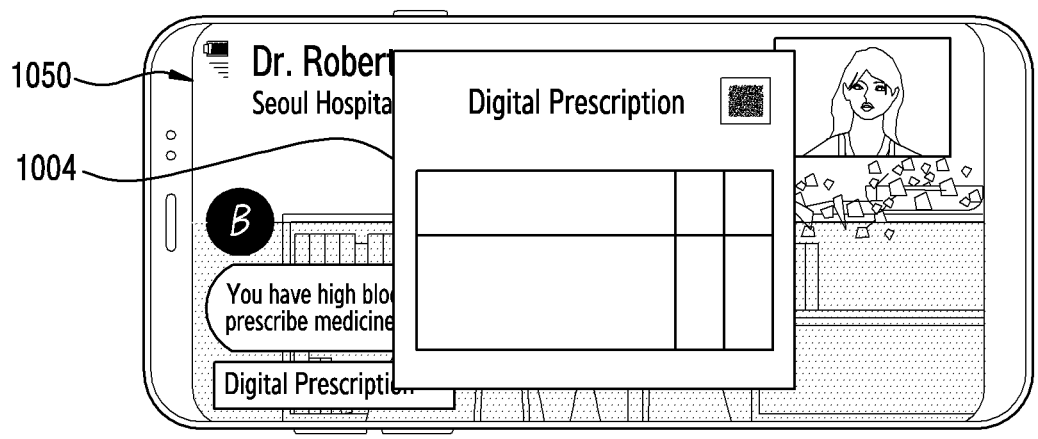
Figure 10:
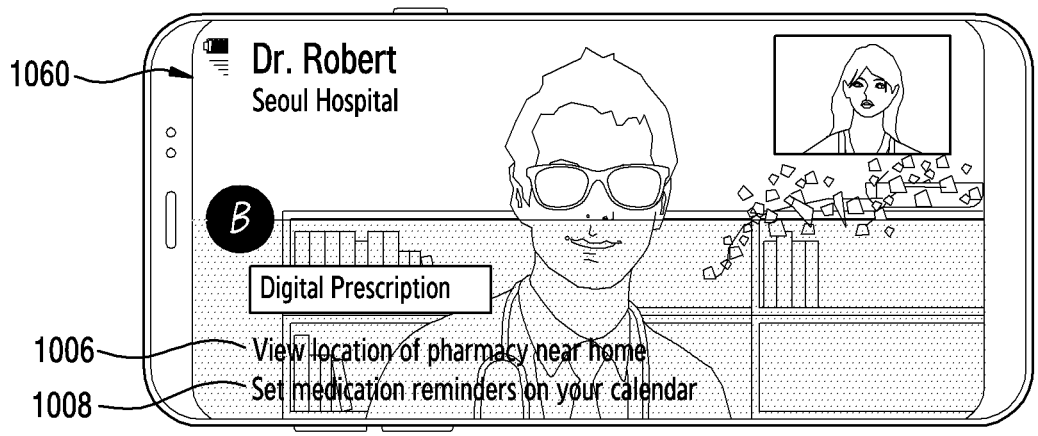

FIG. 10 illustrates another example of a UI of an electronic device that executes a telemedicine application according to various embodiments. The UIs of FIG. 10 may be displayed on a patient's terminal.

Referring to FIG. 10, the electronic device 100 of a patient who executes a telemedicine application may display a fourth UI 1040, a fifth UI 1050, or a sixth UI 1060.

A doctor may issue an electronic prescription. The fourth UI 1040 may include an icon 1002 representing the electronic prescription received from the doctor's electronic device. When an input of a user (that is, a patient) to the icon 1002 is received, the electronic device 100 may display a fifth UI 1050 including an electronic prescription 1004. The electronic device 100 may display the fifth UI 1050 in which the electronic prescription 1004 in the form of an electronic document is superimposed on the fourth UI 1040.

The electronic device 100 may display a sixth UI 1060 when the electronic prescription is received. The sixth UI 1060 may include a guide 1006 that can display the location of a pharmacy around a residence. For example, the electronic device 100 may determine that the user of the electronic device 100 is located in her/his residence based on information included in the electronic prescription and location information of the electronic device 100. The electronic device 100 may generate a hint of "view the location of pharmacies near my residence" based on the determination that the user is located at home.

The sixth UI 1060 may include a guide 1008 capable of setting a medication notice in a schedule application. For example, the electronic device 100 may display the sixth UI 1060, which induces the schedule application to set a notification, based on a medication schedule included in the electronic prescription.

Figure 11:
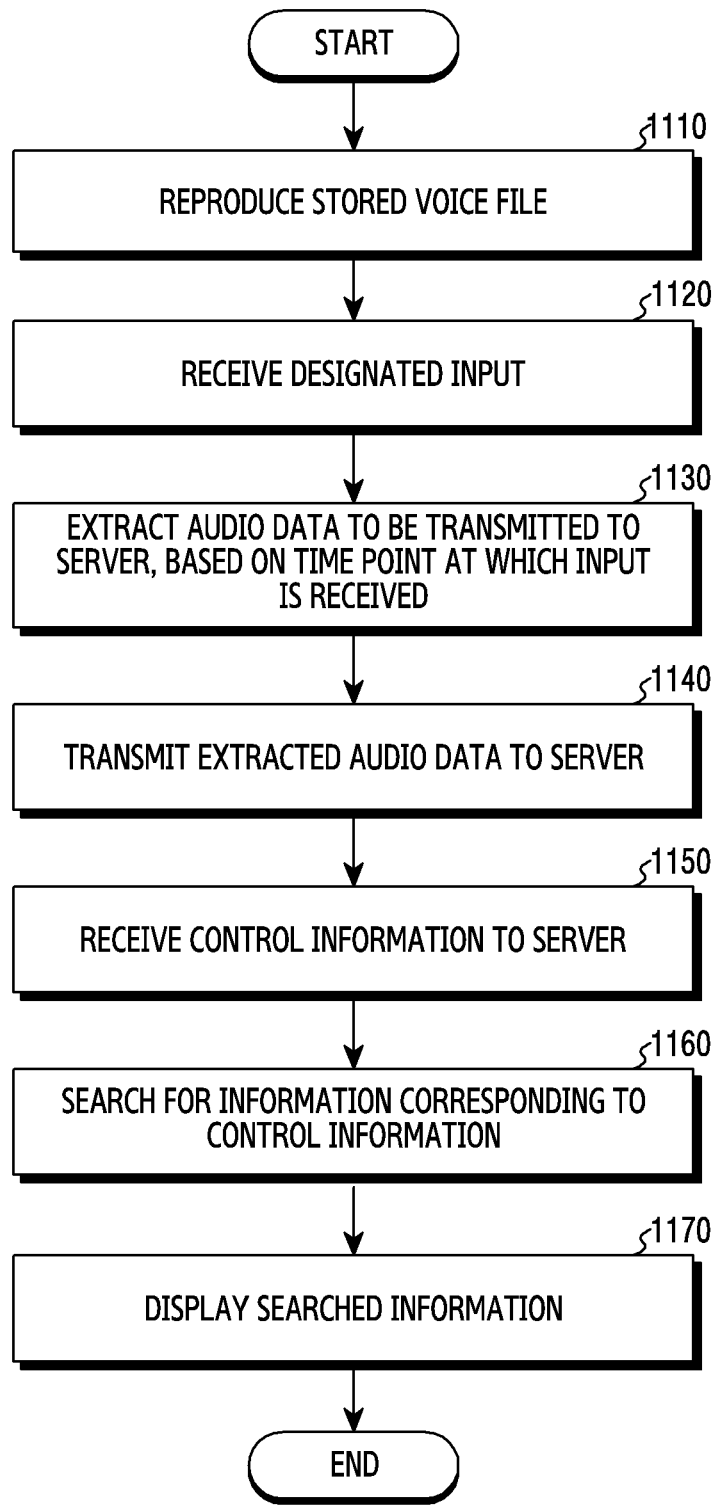
FIG. 11 illustrates an example of an operation of executing a recording application in an electronic device according to various embodiments.

FIG. 11 illustrates an example of an operation of executing a recording application in the electronic device 100 according to various embodiments.

Referring to FIG. 11, in operation 1110, the processor 120 may reproduce a voice file (or an audio file or a video file) stored in the memory 130 through a recording application. For example, the voice file may be obtained by recording a lecture of a lecturer by a user of the electronic device 100.

In operation 1120, the processor 120 may receive designated input while the voice file is reproduced. The designated input may include input from a user or input in the case where a pre-stored condition is satisfied.

In operation 1130, the processor 120 may extract audio data for transmission of the audio data to the server 108 based on the time point at which the designated input is received while the voice file is reproduced. For example, when the designated input is received, the voice recognition unit 430 may request audio data from the audio data management unit 410. The audio data management unit 410 may extract audio data to be transmitted to the server 108 in response to receiving the request from the voice recognition unit 430. The audio data management unit 410 may extract audio data from the time point at which the designated input is received (i.e., the time point at which the request is received) until the start of a reference period (e.g., 10 seconds or 5 seconds), among the audio data stored in the memory 130. For example, the extracted audio data may be the speaker's speech, "Yes, check the schedule tomorrow and let me know". The audio data management unit 410 may transmit the extracted audio data to the speech recognition unit 430.

In operation 1140, the processor 120 may transmit the extracted audio data to the server 108. For example, the speech recognition unit 430 may transmit the audio data received from the audio data management unit 410 to the server 108.

In operation 1150, the processor 120 may receive control information (e.g., a path rule) corresponding to the audio data from the server 108. For example, the control information may include an operation of executing the calendar application in the background, an operation of checking the next day's schedule, and the like.

In operation 1160, the processor 120 may determine whether information corresponding to an intent included in the control information exists. For example, the processor 120 may search for an appointment on the following day in the calendar application.

In operation 1170, the processor 120 may inform the user of the found appointment. For example, the processor 120 may notify the user of an appointment found on the next day through the user interface or through audio.

Meanwhile, in operation 1120, when the designated input is received, the processor 120 may continuously reproduce a voice file. Alternatively, when the designated input is received, the processor 120 may pause the operation of reproducing the voice file.

Figure 12:
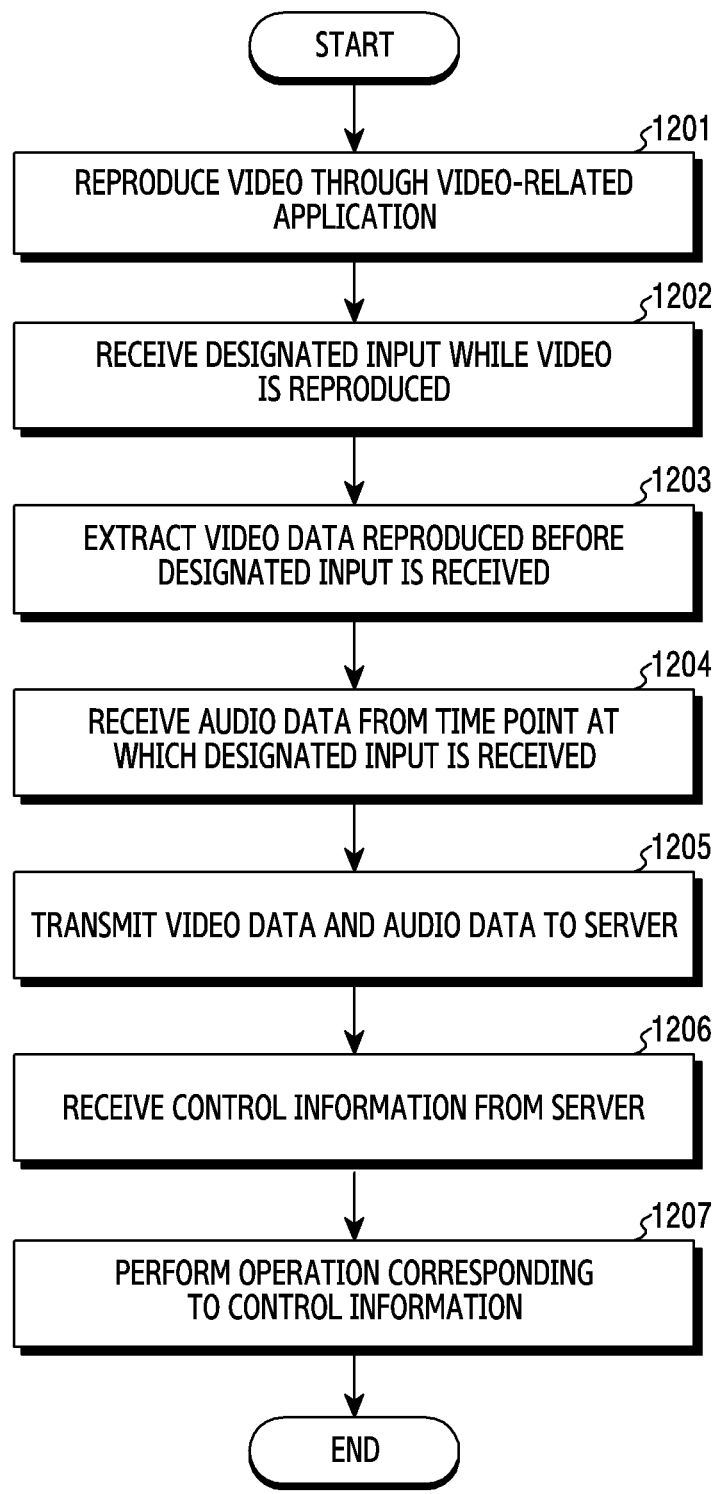
FIG. 12 illustrates an example of an operation of executing a video-related application in an electronic device according to various embodiments.

FIG. 12 illustrates an example of an operation of executing a video-related application in the electronic device 100 according to various embodiments.

Referring to FIG. 12, in operation 1201, the processor 120 may reproduce a video through a video-related application. For example, the processor 120 may reproduce a video stored in the memory 130, or may reproduce a video received from an external device based on streaming. The processor 120 may store (or temporarily store) image data (and/or audio data) included in data related to the video. In some embodiments, when streaming a video, the processor 120 may temporarily store video data (and/or audio data) related to the video in the buffer 530. When the capacity of the buffer 530 is full, the processor 120 may continue to store newly received image data (and/or audio data) while deleting the oldest image data (and/or audio data).

In operation 1202, the processor 120 may receive designated input while the video is reproduced. The designated input may include input from a user or input in the case where a pre-stored condition is satisfied.

In operation 1203, the processor 120 may extract video data (and/or audio data) reproduced before the time point at which the designated input is received while the video is reproduced. The processor 120 may extract video data (and/or audio data) which is reproduced before the designated input is received and is stored in the buffer 530 or the memory 130. The processor 120 may extract the video data (and/or audio data) from the time point at which the designated input is received until the start of a reference period (e.g., 10 seconds or 5 seconds). The video data (and/or audio data) may be extracted for transmission to the server 108.

For example, the user of the electronic device 100 may input the designated input when a car image of interest is reproduced while watching a video related to cars by using a video-related application. For example, the time point at which the designated input is received may be after the car image of interest is reproduced. The processor 120 may extract the video data from 10 seconds before the time point at which the designated input is received up to the time point at which the designated input is received.

In operation 1204, the processor 120 may receive audio data from the time point at which the designated input is received. For example, the processor 120 may activate a microphone in response to receiving the designated input, and may receive audio data of a user through the microphone. For example, the audio data of the user received through the microphone may be the user saying "Just tell me the information on the white car". According to various embodiments, the microphone of the electronic device 100 may always be activated, and the processor 120 may receive the designated input and the audio data of the user based on the user's speech input through the microphone. For example, the designated input received through the microphone that is always active may be the user's speech of "Hi, Bixby", and the audio data of the user received through the microphone may be the user's speech of "Just tell me the information on the white car".

In operation 1205, the processor 120 may transmit the extracted video data and the received audio data to the server 108. For example, the extracted video data may be image data for a vehicle included in a video or video data from the time point at which the designated input is received until the start of the reference period (e.g., 10 seconds or 5 seconds). The received audio data may be the user's speech of "Just tell me the information on the white car".

In operation 1206, the processor 120 may receive control information corresponding to the video data and the audio data from the server 108. For example, the control information may include information about the white car included in the video data. Alternatively, the control information may include an operation of executing a search application in the background, an operation of searching for the white car through the search application, and the like.

In operation 1207, the processor 120 may perform an operation corresponding to the control information. For example, the processor 120 may display information on a vehicle received from the server or information on the vehicle being searched for through the display device 160 (e.g., a display).

An operation method of an electronic device (e.g., the electronic device 100) according to the above-described various embodiments may include: acquiring audio data while a designated application (e.g., a first application) among one or more applications (e.g., one or more applications including a first application, a second application, and a third application) stored in a memory (e.g., the memory 130) of the electronic device is being executed, the acquiring including storing at least a partial section including a plurality of pieces of phoneme information among the audio data in the memory; when a designated condition is satisfied, transmitting the at least the partial section to an external electronic device so that the external electronic device (e.g., the server 108) generates designated information (e.g., control information) for executing at least one application (e.g., the third application) among the one or more applications using at least a portion of the plurality of pieces of phoneme information stored before the designated condition is satisfied; and executing the at least one application in relation to the designated application based at least on the designated information.

According to various embodiments, the operation method may further include transmitting information acquired based at least on the execution of the at least one application (e.g., the third application) to the other external electronic device (e.g., an electronic device of a counterpart {e.g., a doctor or a friend}) using a communication circuit (e.g., the communication module 190) of the electronic device.

According to various embodiments, the storing of the at least the partial section including the plurality of pieces of phoneme information in the memory may include identifying the plurality of pieces of phoneme information included in the audio data and selecting the at least the partial section based at least on the identified result.

According to various embodiments, when input through a physical key is received, the designated condition may include the case in which input to an object included in a user interface of the designated application (e.g., the first application) is received, the case in which a designated word is received through a microphone (e.g., the input device 150) of the electronic device, the case in which the designated word is included in the acquired audio data, the case in which the audio data is not acquired for a designated time or longer, and the case in which the intonation of the audio data is changed to a designated intonation.

According to various embodiments, the transmission of the at least the partial section to the external electronic device (e.g., the server 108) may include extracting the at least the partial section to be transmitted to the external electronic device based on the time point at which the designated condition is satisfied.

According to various embodiments, the transmission of the at least the partial section to the external electronic device (e.g., the server 108) may include transmitting the at least the partial section having a designated size, which is stored most recently with respect to the time point at which the designated condition is satisfied, to the external electronic device among the acquired audio data, when the designated condition is satisfied.

According to various embodiments, the designated application may be one of a call application or a telemedicine application, and the storing of the at least the partial section including the plurality of pieces of phoneme information in the memory may include distinguishing and storing the audio data acquired through the microphone (e.g., the input device 150) of the electronic device and the audio data acquired through the communication circuit (e.g., the communication module 190) of the electronic device while the designated application is being executed.

According to various embodiments, the operation method may further include acquiring other audio data after the designated condition is satisfied and transmitting at least a portion of the other audio data to the external electronic device so that the external electronic device generates the designated information using another piece of phoneme information included in the other audio data.

According to various embodiments, the operation method may further include displaying information acquired according to a result obtained by executing the at least one application (e.g., the third application) through the display of the electronic device (e.g., the display device 160) based on the designated information.

In the detailed description of the disclosure, specific embodiments have been described, but various modifications are possible without departing from the scope of the disclosure. Therefore, the scope of the disclosure should not be limited to the described embodiments, but should be determined not only by the scope of claims to be described later, but also by the scope and equivalents of the claims.

The invention claimed is:

1. An electronic device comprising:
a memory in which one or more applications are installed;
a communication circuit; and
a processor,
wherein the processor is configured to:
acquire audio data while a designated application among the one or more applications is being executed, comprising storing at least a partial section including a plurality of pieces of phoneme information among the audio data in the memory,
when a designated condition is satisfied, transmit the at least the partial section to an external electronic device so that the external electronic device generates designated information for executing at least one application among the one or more applications using at least a portion of the plurality of pieces of phoneme information stored before the designated condition is satisfied, wherein the designated information includes path rule including at least one of information on parameters required to perform action for performing function of the at least one application or an order of execution of the at least one application,
obtain the designated information from the external electronic device, and
execute the at least one application in relation to the designated application based at least on the designated information,
wherein the designated application is a telemedicine application,
wherein the at least one application includes a health-care application, and
wherein the processor is further configured to distinguish and store the audio data acquired through a microphone of the electronic device and the audio data acquired through the communication circuit while the designated application is being executed.

2. The electronic device of claim 1, wherein the processor is further configured to transmit information acquired based at least on executing the at least one application to another external electronic device using the communication circuit.

3. The electronic device of claim 1, wherein the processor is further configured to:
identify the plurality of pieces of phoneme information included in the audio data, and
select the at least the partial section based at least on an identified result.

4. The electronic device of claim 1, wherein the processor is further configured to:
determine that the designated condition is satisfied when at least one of a case in which an input through a physical key is received, a case in which an input for an object included in a user interface of the designated application is received, a case in which a designated word is received through a microphone of the electronic device, a case in which a designated word is included in the acquired audio data, a case in which the audio data is not acquired for a designated time or longer, or a case in which an intonation of the audio data is changed to a designated intonation is satisfied.

5. The electronic device of claim 1, wherein, when the designated condition is satisfied, the processor is further configured to transmit the at least the partial section having a designated size, which is stored last with respect to a time point at which the designated condition is satisfied, among the acquired audio data to the external electronic device.

6. The electronic device of claim 1, wherein the processor is further configured to:
further acquire other audio data after the designated condition is satisfied; and
further transmit at least a portion of the other audio data to the external electronic device so that the external electronic device generates the designated information by further using other phoneme information included in the other audio data.

7. A method of an electronic device comprising:
acquiring audio data while a designated application among one or more applications stored in a memory of an electronic device is being executed, the acquiring comprising storing at least a partial section including a plurality of pieces of phoneme information among the audio data in the memory;
when a designated condition is satisfied, transmitting the at least the partial section to an external electronic device so that the external electronic device generates designated information for executing at least one application among the one or more applications using at least a portion of the plurality of pieces of phoneme information stored before the designated condition is satisfied, wherein the designated information includes path rule including at least one of information on parameters required to perform action for performing function of the at least one application or an order of execution of the at least one application;
obtaining the designated information from the external electronic device; and
executing the at least one application in relation to the designated application based at least on the designated information,
wherein the designated application is a telemedicine application,
wherein the at least one application includes a health-care application, and
wherein the storing the at least the partial section including the plurality of pieces of phoneme information in the memory comprises distinguishing and storing the audio data acquired through a microphone of the electronic device and the audio data acquired through a communication circuit of the electronic device while the designated application is being executed.

8. The method of claim 7, further comprising:
transmitting information acquired based at least on the executing the at least one application to the other external electronic device using a communication circuit of the electronic device.

9. The method of claim 7, wherein the storing the at least the partial section including the plurality of pieces of phoneme information in the memory comprises:
identifying the plurality of pieces of phoneme information included in the audio data, and
selecting the at least the partial section based at least on a result of the identifying.

10. The method of claim 7, wherein the designated condition comprises at least one of a case in which an input through a physical key is received, a case in which an input to an object included in a user interface of the designated application is received, a case in which a designated word is received through a microphone of the electronic device, a case in which the designated word is included in the acquired audio data, a case in which the audio data is not acquired for a designated time or longer, and a case in which an intonation of the audio data is changed to a designated intonation.

11. The method of claim 7, wherein the transmitting the at least the partial section to the external electronic device comprises transmitting the at least the partial section having a designated size, which is stored last with respect to a time point at which the designated condition is satisfied, among the acquired audio data, to the external electronic device when the designated condition is satisfied.

12. The method of claim 7, further comprising:
   further acquiring other audio data after the designated condition is satisfied; and
   transmitting at least a portion of the other audio data to the external electronic device so that the external electronic device generates the designated information using another piece of phoneme information included in the other audio data.

13. A non-transitory computer-readable recording medium that stores a program performing a method comprising:
   acquiring audio data while a telemedicine application among one or more applications stored in a memory of an electronic device is being executed, the acquiring comprising storing at least a partial section including a plurality of pieces of phoneme information among the audio data in the memory;
   when a designated condition is satisfied, transmitting the at least the partial section to an external electronic device so that the external electronic device generates designated information for executing at least one health-care application among the one or more applications using at least a portion of the plurality of pieces of phoneme information stored before the designated condition is satisfied, wherein the designated information includes path rule including at least one of information on parameters required to perform action for performing function of the at least one health-care application or an order of execution of the at least one health-care application;
   obtaining the designated information from the external electronic device; and
   executing the at least one health-care application in relation to the telemedicine application based at least on the designated information,
   wherein the storing the at least the partial section including the plurality of pieces of phoneme information in the memory comprises distinguishing and storing the audio data acquired through a microphone of the electronic device and the audio data acquired through a communication circuit of the electronic device while the telemedicine application is being executed.

* * * * *